(12) United States Patent
Madduri et al.

(10) Patent No.: US 11,704,124 B2
(45) Date of Patent: *Jul. 18, 2023

(54) INSTRUCTIONS FOR VECTOR MULTIPLICATION OF UNSIGNED WORDS WITH ROUNDING

(71) Applicant: Intel Corporation, Santa Clara, CA (US)

(72) Inventors: Venkateswara R. Madduri, Austin, TX (US); Carl Murray, Dublin (IE); Elmoustapha Ould-Ahmed-Vall, Chandler, AZ (US); Mark J. Charney, Lexington, MA (US); Robert Valentine, Kiryat Tivon (IL); Jesus Corbal, King City, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/573,556

(22) Filed: Jan. 11, 2022

(65) Prior Publication Data

US 2022/0318009 A1 Oct. 6, 2022

Related U.S. Application Data

(63) Continuation of application No. 16/642,778, filed as application No. PCT/US2017/053649 on Sep. 27, 2017, now Pat. No. 11,221,849.

(51) Int. Cl.
*G06F 9/22* (2006.01)
*G06F 9/30* (2018.01)
*G06F 9/38* (2018.01)

(52) U.S. Cl.
CPC ........ *G06F 9/3001* (2013.01); *G06F 9/30036* (2013.01); *G06F 9/30145* (2013.01); *G06F 9/3802* (2013.01)

(58) Field of Classification Search
CPC ............... G06F 9/3001; G06F 9/30036; G06F 9/30145; G06F 9/3802
See application file for complete search history.

(56) References Cited

U.S. PATENT DOCUMENTS

| | | | | |
|---|---|---|---|---|
| 4,736,335 A | * | 4/1988 | Barkan | G06F 7/5312 708/514 |
| 6,115,733 A | * | 9/2000 | Oberman | G06F 7/5443 712/E9.02 |

(Continued)

FOREIGN PATENT DOCUMENTS

WO 2016/105690 A1 6/2016

OTHER PUBLICATIONS

International Search Report and Written Opinion, PCT App. No. PCT/US2017/053649, dated Jun. 19, 2018, 14 pages.

(Continued)

*Primary Examiner* — Cheng Yuan Tseng
(74) *Attorney, Agent, or Firm* — Nicholson De Vos Webster & Elliott LLP

(57) ABSTRACT

Disclosed embodiments relate to executing a vector multiplication instruction. In one example, a processor includes fetch circuitry to fetch the vector multiplication instruction having fields for an opcode, first and second source identifiers, and a destination identifier, decode circuitry to decode the fetched instruction, execution circuitry to, on each of a plurality of corresponding pairs of fixed-sized elements of the identified first and second sources, execute the decoded instruction to generate a double-sized product of each pair of fixed-sized elements, the double-sized product being represented by at least twice a number of bits of the fixed size, and generate an unsigned fixed-sized result by rounding the most significant fixed-sized portion of the double-sized product to fit into the identified destination.

23 Claims, 19 Drawing Sheets

(56) References Cited

U.S. PATENT DOCUMENTS

| | | | | |
|---|---|---|---|---|
| 6,134,574 | A * | 10/2000 | Oberman | G06F 17/16 |
| | | | | 712/E9.071 |
| 6,223,198 | B1 * | 4/2001 | Oberman | G06F 7/5443 |
| | | | | 708/620 |
| 6,961,845 | B2 * | 11/2005 | Roussel | G06F 9/3001 |
| | | | | 712/222 |
| 7,600,104 | B2 * | 10/2009 | Neumann | G06F 9/3001 |
| | | | | 712/222 |
| 7,769,797 | B2 * | 8/2010 | Cho | G06F 7/5324 |
| | | | | 708/625 |
| 2006/0041610 | A1 | 2/2006 | Hokenek et al. | |
| 2009/0049113 | A1 | 2/2009 | Muff et al. | |
| 2009/0249039 | A1 | 10/2009 | Hook et al. | |
| 2015/0277904 | A1 | 10/2015 | Espasa et al. | |
| 2015/0378736 | A1 * | 12/2015 | Gueron | G06F 9/30196 |
| | | | | 712/208 |

OTHER PUBLICATIONS

Non-Final Office Action, U.S. Appl. No. 16/642,778, dated Mar. 29, 2021, 8 pages.

Notice of Allowance, U.S. Appl. No. 16/642,778, dated Sep. 16, 2021, 8 pages.

* cited by examiner

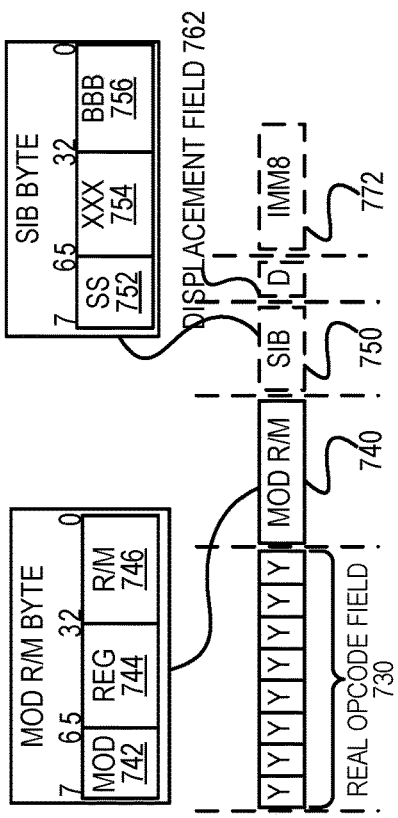
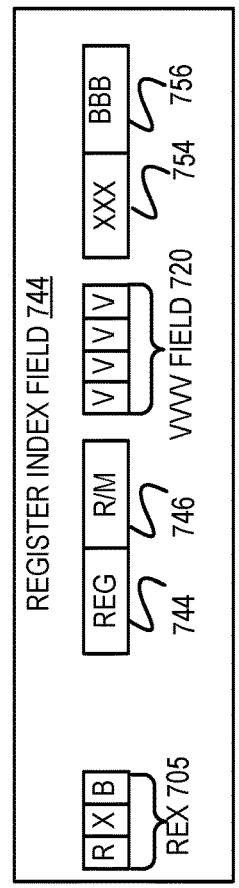
FIG. 7C
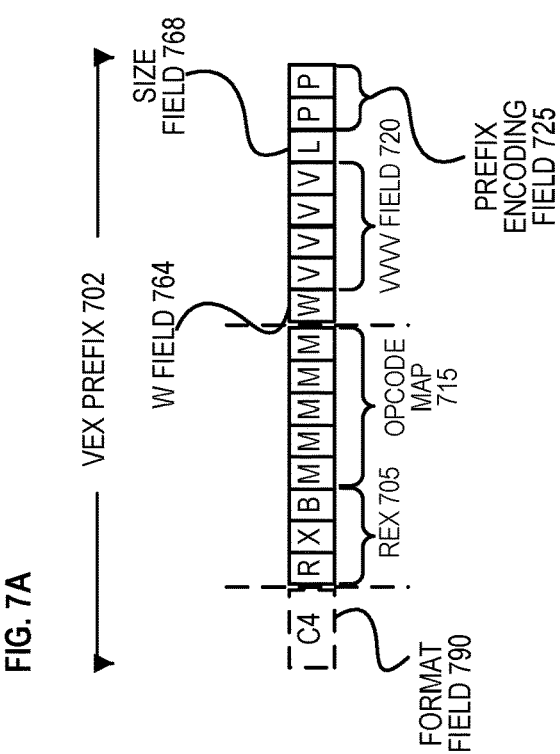
FIG. 7A
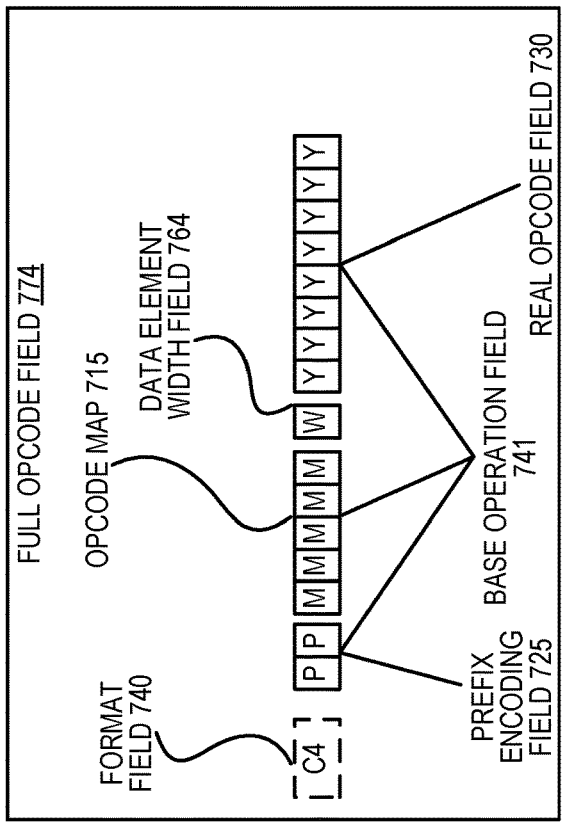
FIG. 7B

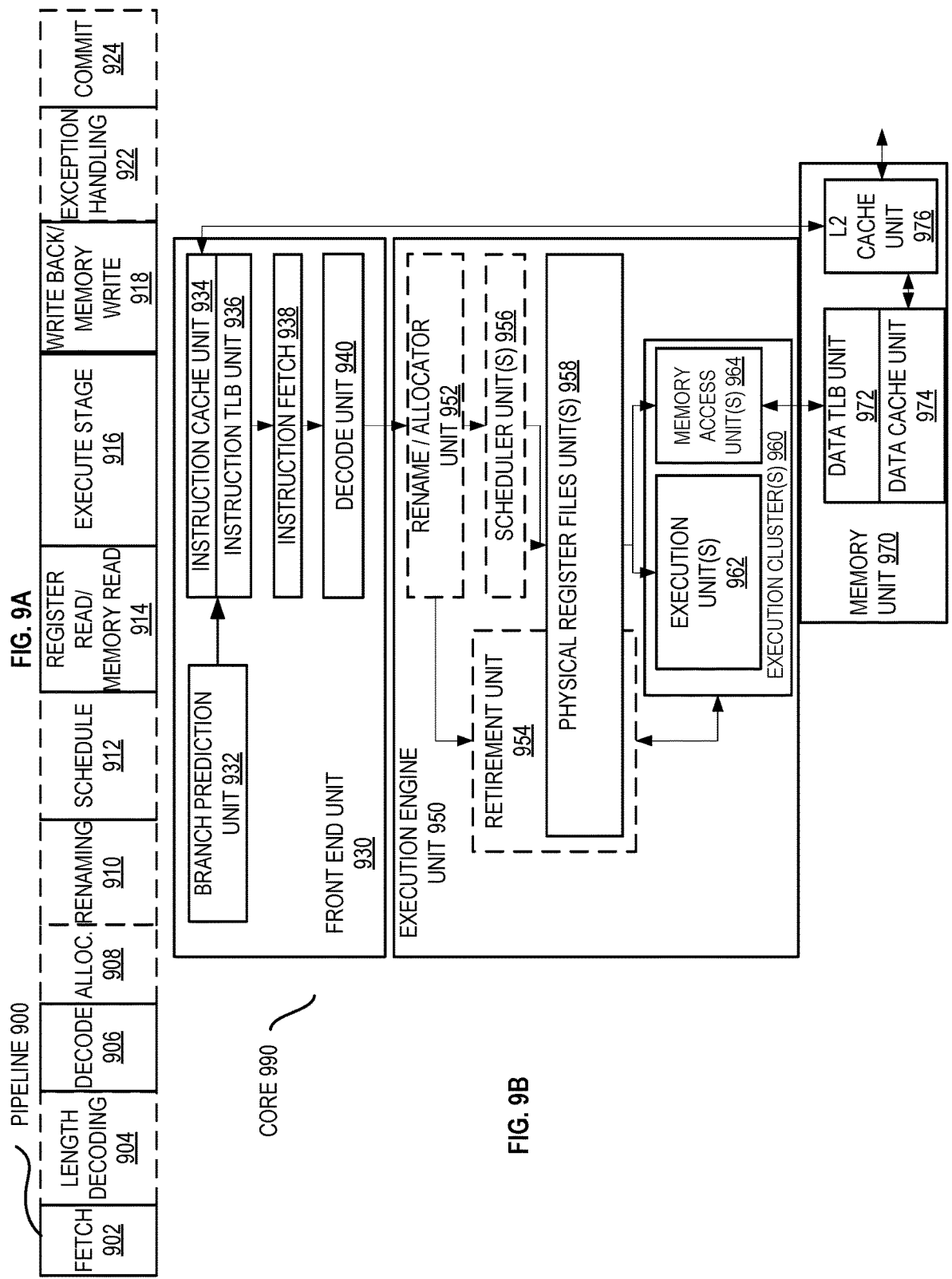

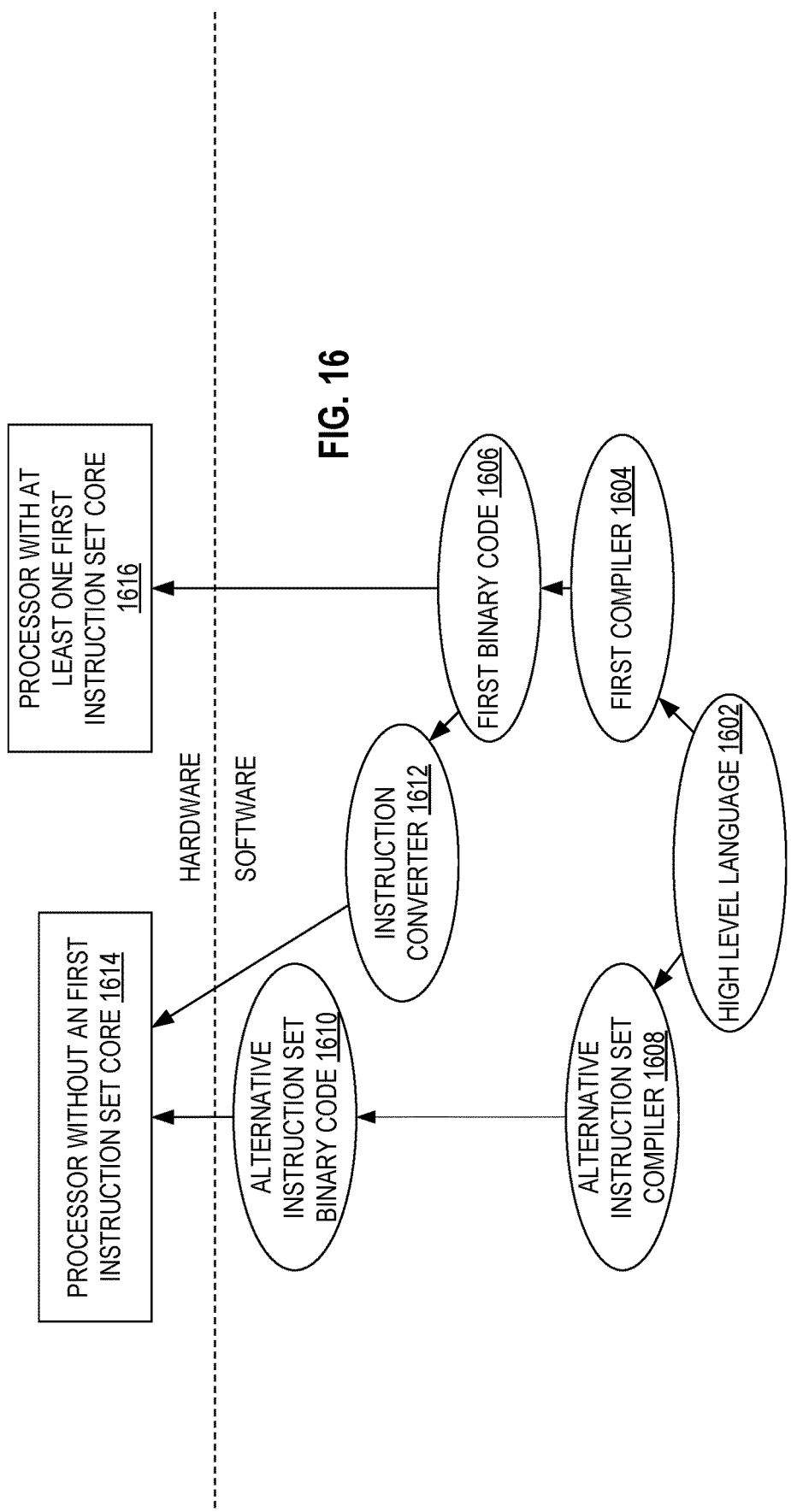

INSTRUCTIONS FOR VECTOR MULTIPLICATION OF UNSIGNED WORDS WITH ROUNDING

CROSS-REFERENCE TO RELATED APPLICATIONS

The present patent application is a continuation application claiming priority from U.S. patent application Ser. No. 16/642,778 filed Feb. 27, 2020, now U.S. Pat. No. 11,221,849, which is a national stage application of International Application No. PCT/US2017/053649 filed Sep. 27, 2017, which are incorporated herein by reference.

FIELD OF INVENTION

The field of invention relates generally to computer processor architecture, and, more specifically, to instructions for vector multiplication of unsigned words with rounding.

BACKGROUND

A (e.g., hardware) processor, or set of processors, executes instructions from an instruction set, e.g., the instruction set architecture (ISA). The instruction set is the part of the computer architecture related to programming, and generally includes the native data types, instructions, register architecture, addressing modes, memory architecture, and interrupt and exception handling.

Certain functions may include operations on vectors containing multiple fixed-sized data elements. Certain operations on a plurality of vectors may multiply each fixed-sized element from one vector with a corresponding fixed-sized element of another vector to produce a product for each pair of elements. As used herein, the term "corresponding" refers to vector elements that occupy a same relative position within their associated vectors. To generate precise products, each of the products of such pair of corresponding fixed-sized vector elements is double-sized, requiring at least twice as many bits as the fixed size. The memory and register resources required to hold the double-sized products, especially when vectors are involved, can be costly.

BRIEF DESCRIPTION OF THE DRAWINGS

The present invention is illustrated by way of example and not limitation in the figures of the accompanying drawings, in which like references indicate similar elements and in which:

FIG. 7A is a block diagram illustrating an exemplary specific vector friendly instruction format according to embodiments of the invention;

FIG. 7B is a block diagram illustrating the fields of the specific vector friendly instruction format that make up the full opcode field according to one embodiment of the invention;

FIG. 7C is a block diagram illustrating the fields of the specific vector friendly instruction format that make up the register index field according to one embodiment of the invention;

FIG. 9A is a block diagram illustrating both an exemplary in-order pipeline and an exemplary register renaming, out-of-order issue/execution pipeline according to embodiments of the invention;

FIG. 9B is a block diagram illustrating both an exemplary embodiment of an in-order architecture core and an exemplary register renaming, out-of-order issue/execution architecture core to be included in a processor according to embodiments of the invention;

FIG. 10A is a block diagram of a single processor core, along with its connection to the on-die interconnect network and with its local subset of the Level 2 (L2) cache, according to embodiments of the invention;

FIG. 10B is an expanded view of part of the processor core in FIG. 10A according to embodiments of the invention;

FIG. 12 shows a block diagram of a system in accordance with one embodiment of the present invention;

FIG. 13 is a block diagram of a first more specific exemplary system in accordance with an embodiment of the present invention;

FIG. 14 is a block diagram of a second more specific exemplary system in accordance with an embodiment of the present invention;

FIG. 15 is a block diagram of a System-on-a-Chip (SoC) in accordance with an embodiment of the present invention; and FIG. 16 is a block diagram contrasting the use of a software instruction converter to convert binary instructions

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments herein disclose execution of vector multiplication instructions (such as VPMULUWR) that multiply unsigned words in source vector registers. In some embodiments, the words are represented as unsigned integers in two's complement (2s complement) format. The product is compressed, using rounding, and the high bits of the result are stored into a destination. A programmable control register provides rounding control. The functionality implemented by these instructions is useful in performing vector multiplication, with rounding to compress the double-sized results to fit into a fixed size of the vector elements.

Existing instruction set architectures require multiple instructions to implement vector multiplication and compression functionality—one to perform the multiplication of the vector elements, and one to round the double-sized results into the fixed size of the destination vector register elements.

Instead, embodiments disclosed herein provide a single instruction to multiply vector elements, and compress the double-sized result to fit into the fixed size of the vector elements.

EXEMPLARY HARDWARE TO EXECUTE THE VPMULUWR INSTRUCTION

Figure 1:
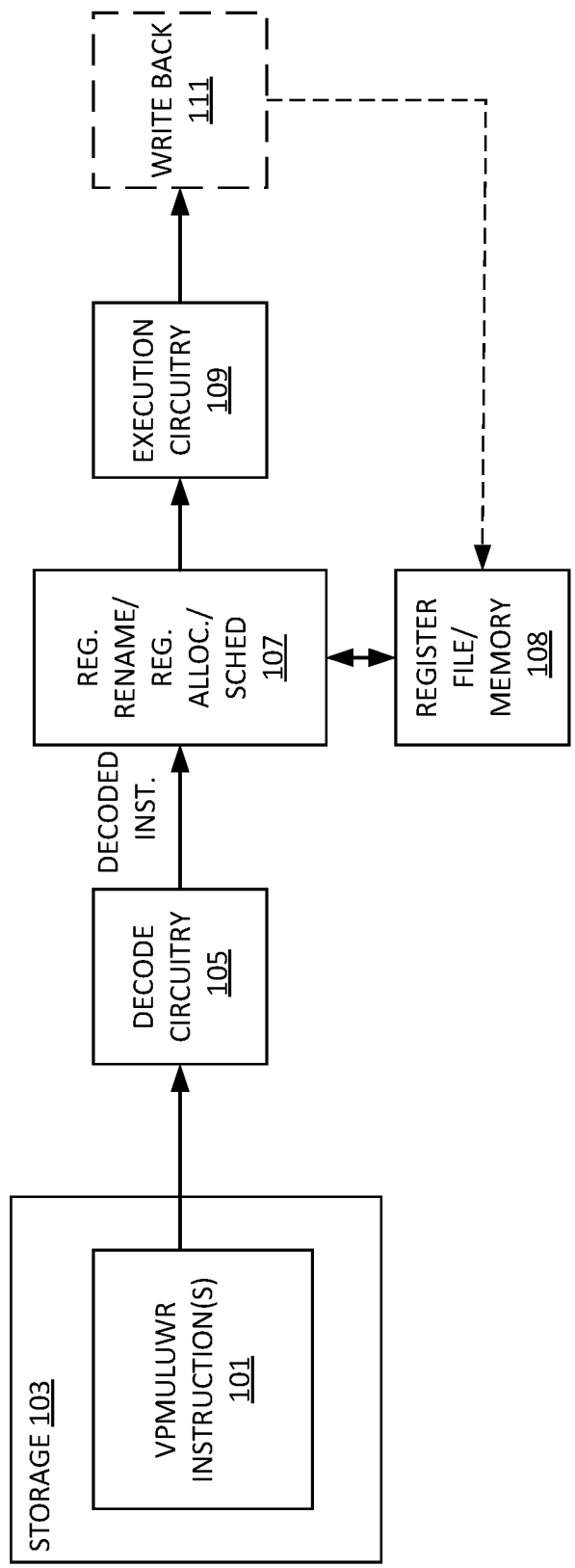
FIG. 1 is a block diagram illustrating processing components for executing instructions for vector multiplication of unsigned words with rounding, according to an embodiment.

FIG. 1 illustrates an embodiment of an execution circuit to process a vector multiplication and compress instruction, such as VPMULUWR. As illustrated, storage 103 stores a VPMULUWR instruction 101 to be executed.

The instruction is received by decode circuitry 105. For example, the decode circuitry 105 receives this instruction from fetch logic/circuitry (not shown). The instruction 101 includes fields for an opcode (such as VPMULUWR), a destination identifier, a first source identifier, and a second source identifier. In some embodiments, the source[s] and destination are registers, and in other embodiments one or more are memory locations. More detailed embodiments of at least one instruction format will be detailed later. The decode circuitry 105 decodes the instruction into one or more operations. In some embodiments, this decoding includes generating a plurality of micro-operations to be performed by execution circuitry (such as execution circuitry 109). The decode circuitry 105 also decodes instruction prefixes (if used).

In some embodiments, register renaming, register allocation, and/or scheduling circuitry 107 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (such as included in register architecture 800, described below) and/or memory 108 store data as operands of the instruction to be operated on by execution circuitry. Exemplary register types include packed data registers, general purpose registers, and floating point registers.

Execution circuitry 109 executes the decoded VPMULUWR instruction. Exemplary detailed execution circuitry is shown in FIG. 2A-C and FIG. 3. The execution of the decoded VPMULUWR instruction causes the execution circuitry to execute the decoded instruction on each of a plurality of corresponding pairs of fixed-sized elements of first and second source vectors, generate a double-sized product being represented by at least twice a number of bits of the fixed size, and generate an unsigned fixed-sized result by rounding the most significant portion of the double-sized product to fit into a number of bits of the fixed-size.

Write back (retirement) circuitry 111 commits the result of the execution of the decoded VPMULUWR instruction. Write back (retirement) circuitry 111 is optional, at least insofar as it represents functionality that can occur at a different time, at a different stage of the processor's pipeline, or not at all.

Figure 2A:
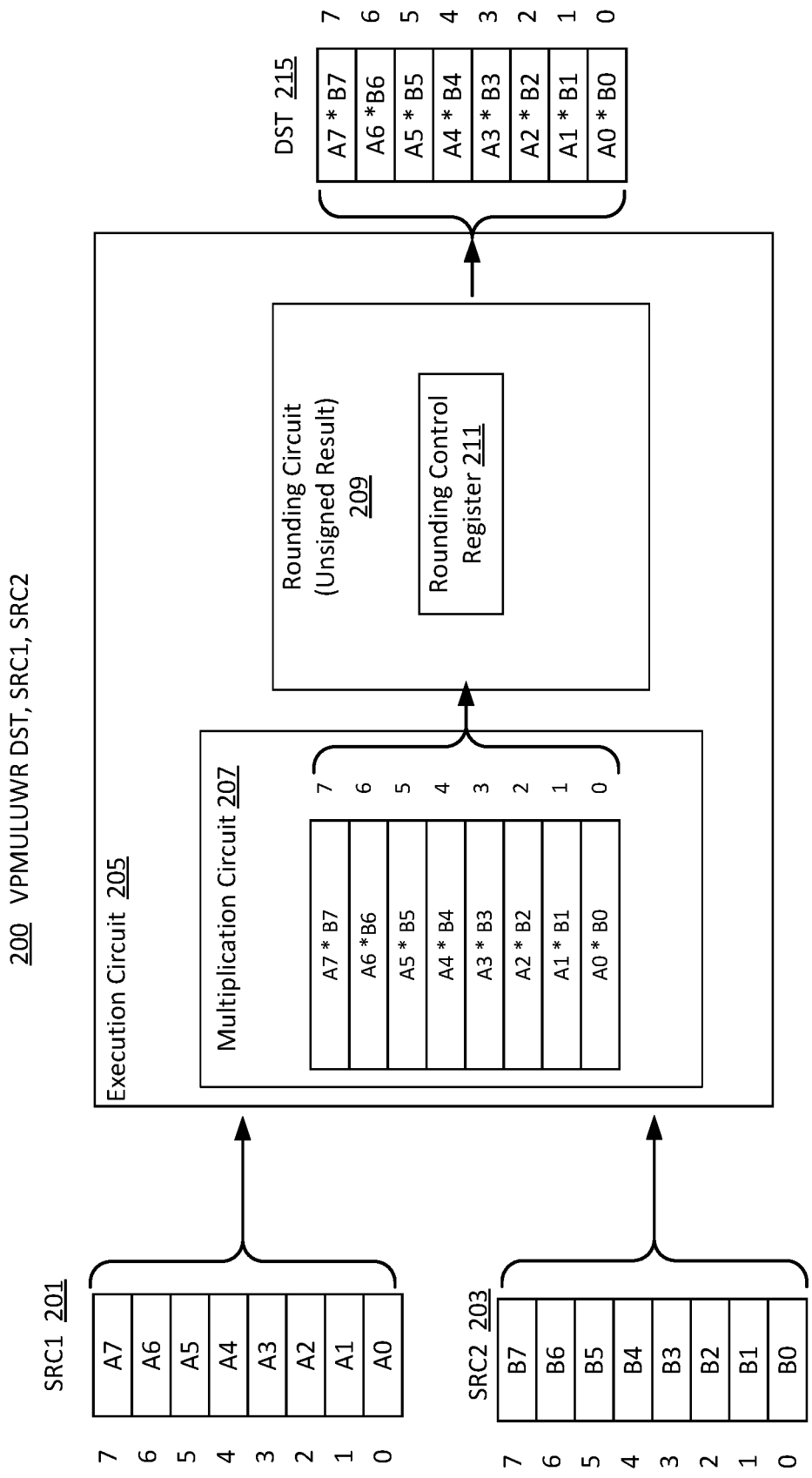
FIG. 2A is a block diagram illustrating execution of a vector multiplication of unsigned words with rounding, according to an embodiment.

FIG. 2A is a block diagram illustrating execution of a vector multiplication of unsigned words with rounding, according to an embodiment. In the illustrated embodiment, execution circuit 205 is to execute a decoded vector multiplication instruction 200, such as VPMULUWR DST, SRC1, SRC2. Examples of the fetch circuitry to fetch the instruction from code storage, decode circuitry to decode the instruction, and additional circuitry such as for register renaming and allocation, are shown at least in FIG. 9A-B, and are not repeated here.

As shown, instruction 200 (VPMULUWR) includes first and second source identifiers, SRC1 and SRC2, and a destination identifier, DST. The identified first source 201, second source 203, and destination 215 are 128-bit registers having eight 16-bit elements. Using an optional vector-size identifier of the instruction, the identified registers can be 32 bits, 64 bits, 128 bits, 256 bits, or 512 bits. In some embodiments, 32-bit and 64-bit registers identified by the source and destination identifiers are general purpose registers included in a register architecture, such as register architecture 800 of FIG. 8. In some embodiments, 128-bit, 256-bit, and 512-bit registers identified by the source and destination identifiers are vector registers included in a register architecture, such as register architecture 800 of FIG. 8.

In operation, execution circuit 205 uses multiplication circuit 207 to multiply each of eight pairs of corresponding fixed-size elements, each pair consisting of a 16-bit element of SRC1 201 and a corresponding 16-bit element of SRC2 203, to generate a double-sized result represented by at least twice the width of the source elements. As shown, for example, the zeroth product is generated by multiplying the zeroth elements of SRC1 201 and SRC2 203. Execution circuit 205 further uses rounding circuit 209 to compress each of the double-sized multiplication results to fit into the fixed-size, 16-bit wide elements stored in the destination register, DST 215.

Rounding control register 211 is a software-accessible control register that controls the modes of rounding applied by rounding circuit 209. In some embodiments, rounding control register 211 includes a 2-bit rounding control field, which specifies truncation when set to 2'b11, rounding up when set to 2'b10, and, convergent rounding otherwise. In some embodiments, rounding control register 211 specifies one of: rounding to nearest with ties going to nearest even, rounding to nearest with ties going to a nearest integer away from zero, rounding toward zero, rounding toward positive infinity, and rounding toward negative infinity.

Figure 2B:
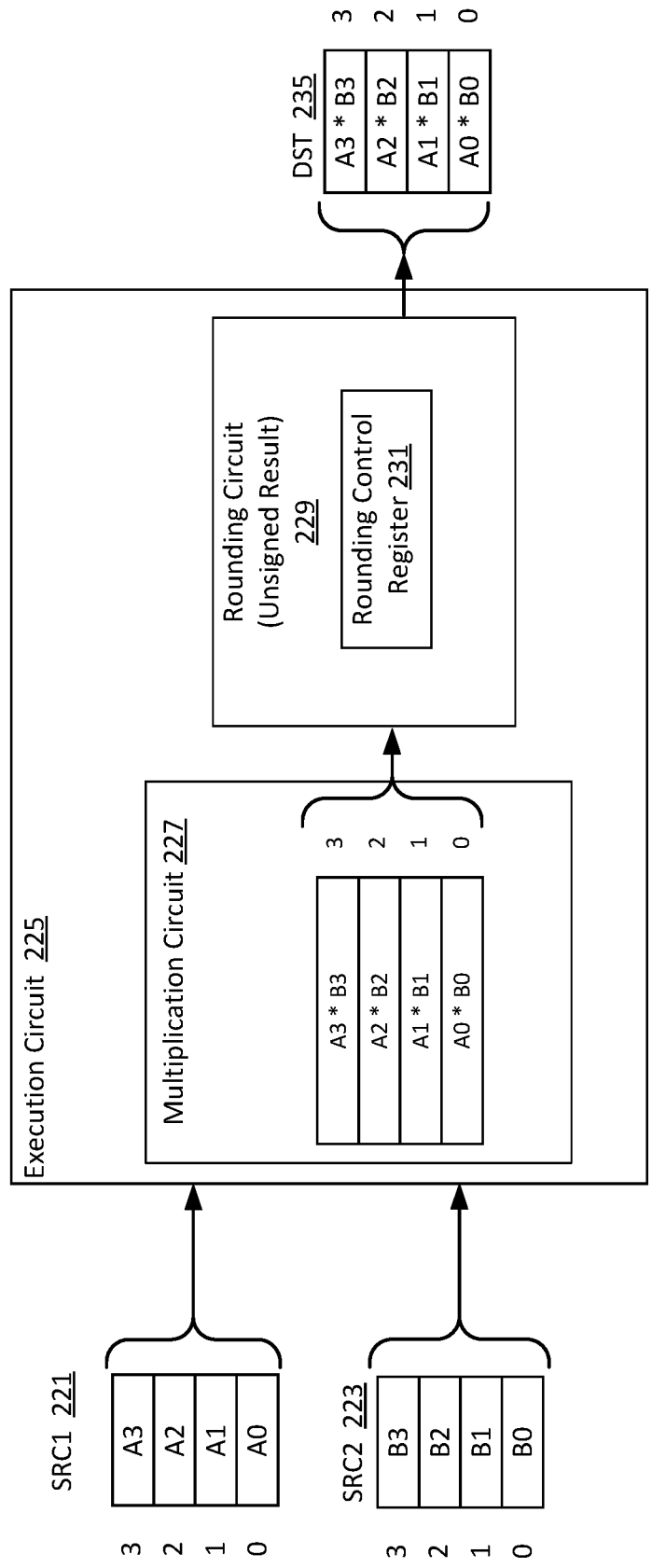
FIG. 2B is a block diagram illustrating execution of a vector multiplication of unsigned words with rounding, according to an embodiment.

FIG. 2B is a block diagram illustrating execution of a vector multiplication of unsigned words with rounding, according to an embodiment. In the illustrated embodiment, execution circuit 225 is to execute a decoded vector multiplication instruction 220, such as VPMULUWR DST, SRC1, SRC2. Examples of the fetch circuitry to fetch the instruction from code storage, decode circuitry to decode the instruction, and additional circuitry such as for register renaming and allocation, are shown at least in FIG. 9A-B, and are not repeated here.

As shown, instruction 220 (VPMULUWR) includes first and second source identifiers, SRC1 and SRC2, and a destination identifier, DST. The identified first source 221, second source 223, and destination 235 are 64-bit registers having four 16-bit elements.

In operation, execution circuit 225 uses multiplication circuit 227 to multiply each of four pairs of corresponding fixed-size elements, each pair consisting of a 16-bit element of SRC1 221 and a corresponding 16-bit element of SRC2 223, to generate a double-sized result represented by at least twice the width of the source elements. As shown, for example, the zeroth product is generated by multiplying the zeroth elements of SRC1 221 and SRC2 223. Execution circuit 225 further uses rounding circuit 229 to compress each of the double-sized multiplication results to fit into the fixed-size, 16-bit wide elements stored in the destination register, DST 235.

Rounding control register 231 is a software-accessible control register that controls the modes of rounding applied by rounding circuit 229. In some embodiments, rounding control register 231 includes a 2-bit rounding control field, which specifies truncation when set to 2'b11, rounding up when set to 2'b10, and, convergent rounding otherwise. In some embodiments, rounding control register 231 specifies one of rounding to nearest with ties going to nearest even, rounding to nearest with ties going to a nearest integer away from zero, rounding toward zero, rounding toward positive infinity, and rounding toward negative infinity.

Figure 2C:
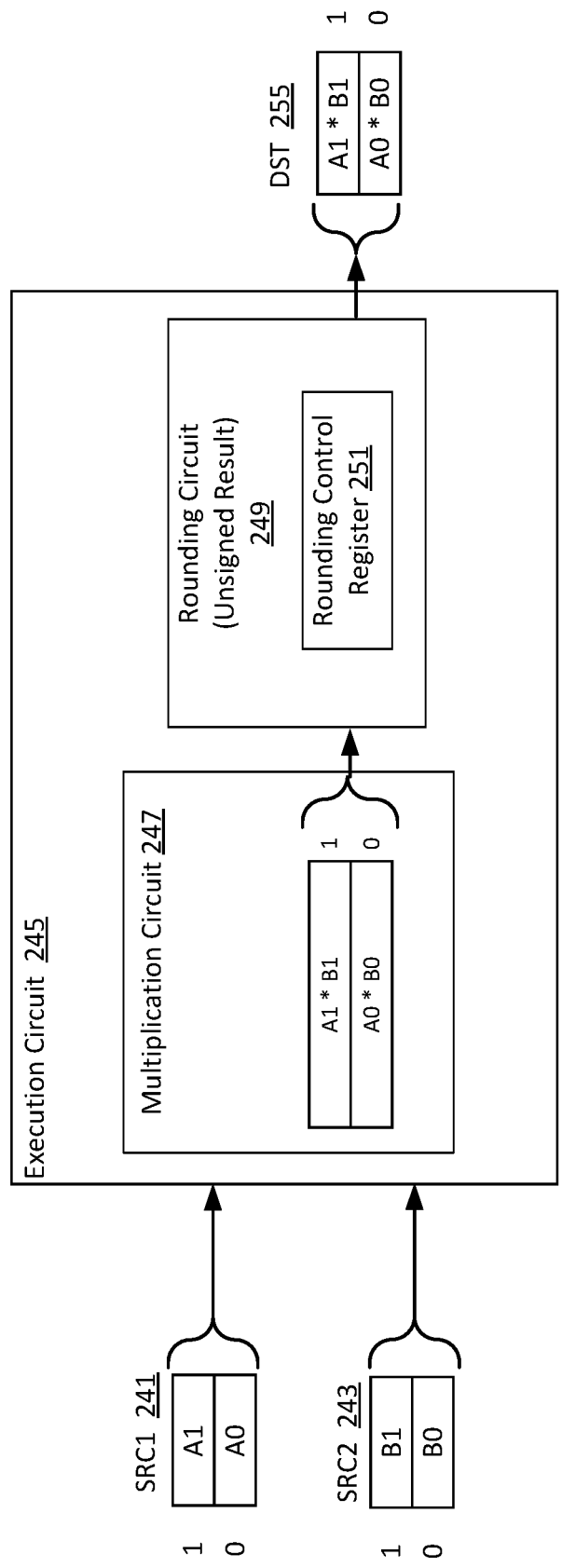
FIG. 2C is a block diagram illustrating execution of a vector multiplication of unsigned words with rounding, according to an embodiment.

FIG. 2C is a block diagram illustrating execution of a vector multiplication of unsigned words with rounding, according to an embodiment. In the illustrated embodiment, execution circuit 245 is to execute a decoded vector multiplication instruction 240, such as VPMULUWR DST, SRC1, SRC2. Examples of the fetch circuitry to fetch the instruction from code storage, decode circuitry to decode the instruction, and additional circuitry such as for register renaming and allocation, are shown at least in FIG. 9A-B, and are not repeated here.

As shown, instruction 240 (VPMULUWR) includes first and second source identifiers, SRC1 and SRC2, and a destination identifier, DST. The identified first source 241, second source 243, and destination 255 are 32-bit registers having two 16-bit elements.

In operation, execution circuit 245 uses multiplication circuit 247 to multiply each of two pairs of corresponding fixed-size elements, each pair consisting of a 16-bit element of SRC1 241 and a corresponding 16-bit element of SRC2 243, to generate a double-sized result represented by at least twice the width of the source elements. As shown, for example, the zeroth product is generated by multiplying the zeroth elements of SRC1 241 and SRC2 243. Execution circuit 245 further uses rounding circuit 249 to compress each of the double-sized multiplication results to fit into the fixed-size, 16-bit wide elements stored in the destination register, DST 255.

Rounding control register 251 is a software-accessible control register that controls the modes of rounding applied by rounding circuit 249. In some embodiments, rounding control register 251 includes a 2-bit rounding control field, which specifies truncation when set to 2'b11, rounding up when set to 2'b10, and, convergent rounding otherwise. In some embodiments, rounding control register 251 specifies one of rounding to nearest with ties going to nearest even, rounding to nearest with ties going to a nearest integer away from zero, rounding toward zero, rounding toward positive infinity, and rounding toward negative infinity.

Figure 3:
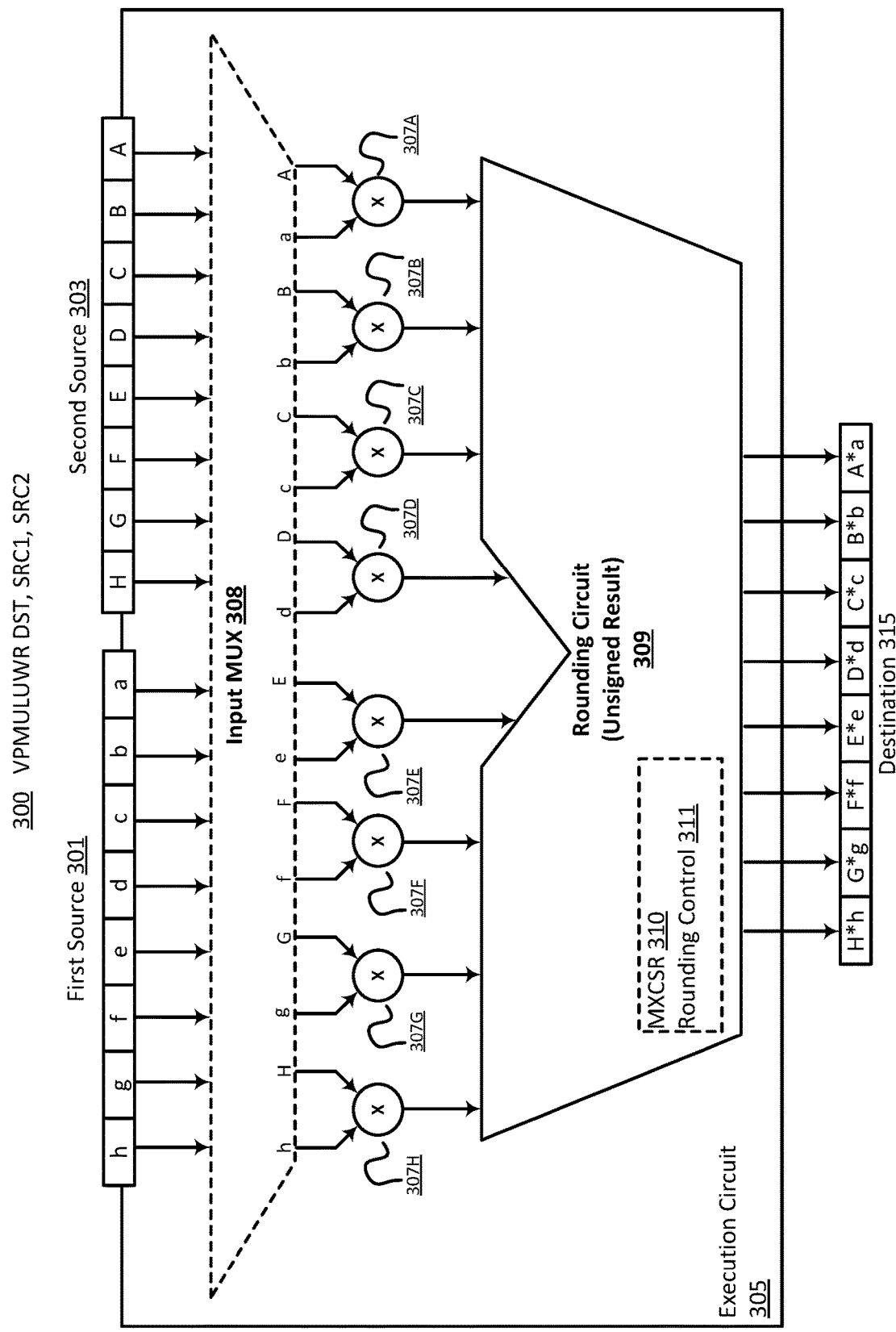
FIG. 3 is a block diagram illustrating execution of a vector multiplication of unsigned words with rounding, according to an embodiment.

FIG. 3 is a block diagram illustrating execution of a vector multiplication of unsigned words with rounding, according to an embodiment. In the illustrated embodiment, execution circuit 305 is to execute a decoded vector multiplication instruction 300, such as VPMULUWR DST, SRC1, SRC2. Examples of the fetch circuitry to fetch the instruction from code storage, decode circuitry to decode the instruction, and additional circuitry such as for register renaming and allocation, are shown at least in FIG. 1 and FIG. 9A-B, and are not repeated here.

As shown, instruction 300 (VPMULUWR) includes first and second source identifiers, SRC1 and SRC2, and a destination identifier, DST. The identified first source 301, second source 303, and destination 315 are 128-bit registers each having 16-bit elements, which can be included in a register architecture, such as register architecture 800 of FIG. 8.

In operation, execution circuit 305 uses optional input mux 308 to route corresponding elements of the identified first source 301 and second source 303 to multipliers 307A-307H, which multiply each pair of corresponding elements to generate a double-sized product represented by at least twice the width of the source elements. As shown, for example, the zeroth product in destination 315 is "A*a," generated by multiplying the zeroth element of SRC1 301, "A," and the zeroth element of SRC2 303, "a." Input mux 308 is optional, and is shown with dashed borders. In some embodiments, input mux 308 is not needed because elements of first source 301 and second source 305 are coupled to multipliers 307A-307H using a fixed mapping.

Note that first source 301, second source 303, and destination 315 are shown as being organized by little endian ordering, with the lower-order elements on the right. In other embodiments, big endian ordering is applied.

Execution circuit 305 further uses rounding circuit 309 to compress each of the double-sized multiplication results to fit into the fixed-size, 16-bit wide elements stored in the destination register, DST 315.

Multimedia Extensions Control and Rounding Register (MXCSR) 310 includes software-programmable rounding control 311, which is structured and operates like rounding control register 211 (FIG. 2). In some embodiments, register MXCSR 310 is part of a processor's architecture, and includes associated instructions in the processor's instruction set architecture.

Exemplary Scaling of Hardware to Execute a VPMULUWR Instruction

Figure 4:
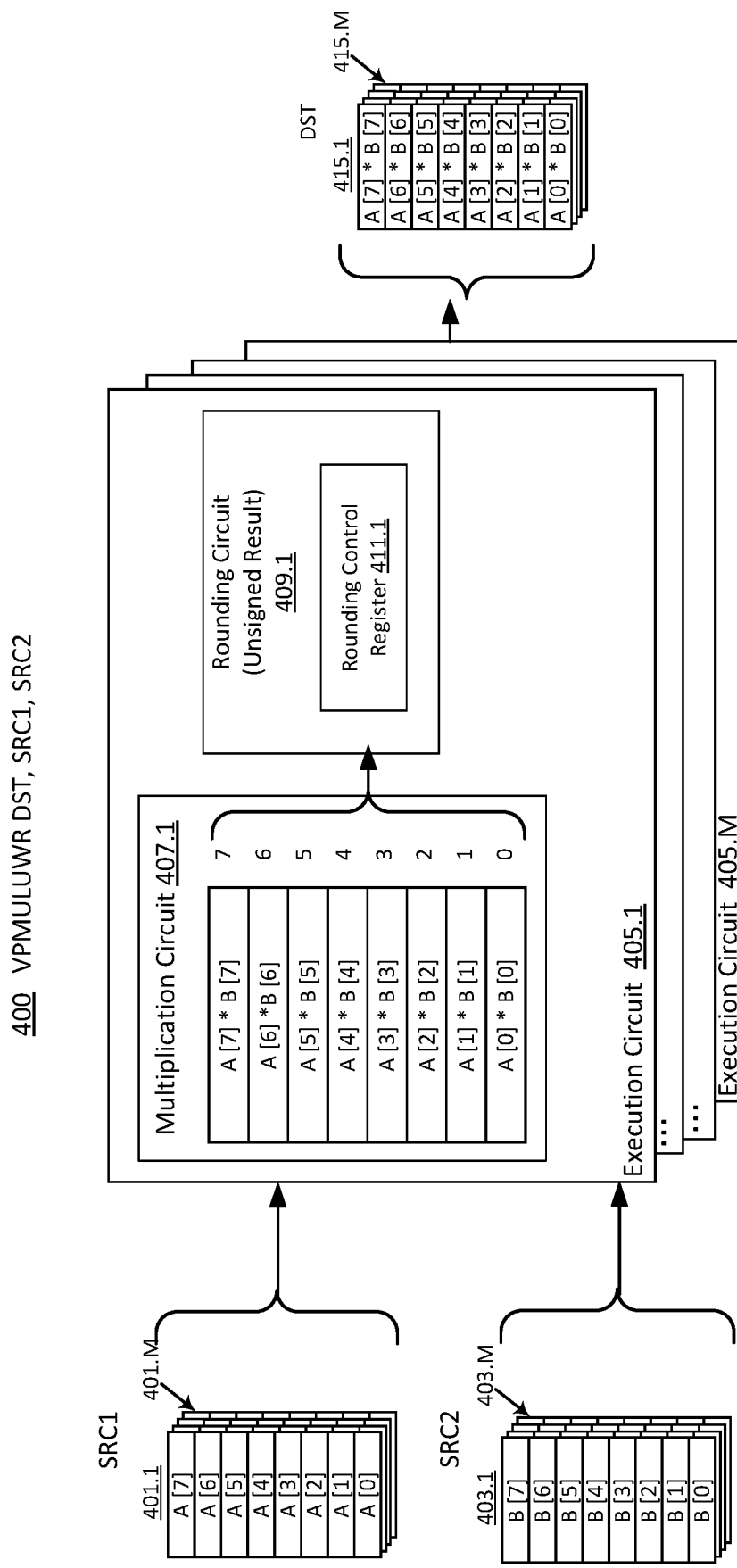
FIG. 4 is a block diagram illustrating scaling of hardware to execute a vector multiplication of unsigned words with rounding instruction, according to some embodiments.

FIG. 4 is a block diagram illustrating scaling of hardware to execute a vector multiplication of unsigned words with rounding instruction, according to some embodiments.

In some embodiments, the default element size to be operated on in response to the VPMULUWR DST, SRC1, SRC2 instruction is 16 bits, regardless of the size of the source and destination vector registers. In some embodiments, the source and destination vector registers are each 128-bit registers, and multiplication circuit 407.1 is to perform eight 16×16 multiplications on eight corresponding pairs of elements of SRC1 401.1 and SRC2 403.1.

In some embodiments, the source and destination vector registers are each 256 bits wide, and the execution circuit 405.1 is to be replicated such that multiplication circuits 407.1 and 407.2 execute sixteen 16×16 multiplications on sixteen corresponding pairs of elements in SRC1 401.1 and 401.2, and SRC 2 403.1 and 403.2.

In some embodiments, the source and destination vector registers are each 512 bits, and the hardware is scaled such that multiplication circuits 407.1 through 407.4 execute 32 16×16 multiplications on 32 corresponding pairs of elements of SRC1 401.1-M and SRC2 403.1-M, where M equals four (4).

In some embodiments, the source and destination vector registers are each 64 bits, and the hardware is scaled such that multiplication circuit 407.1 executes four (4) 16×16 multiplications on four (4) corresponding pairs of elements of SRC1 401.1 and SRC2 403.1. In other words, when the vector registers are each 64 bits, the execution circuits 405.2-405.M and the multiplication circuits included therein, are not needed and not used. In some embodiments, the maximum supported vector register size is 64 bits, in which case execution circuits 405.2-405.M are not included, and only half of the multipliers in multiplication circuit 407.1 are included. FIG. 2B and its related description provide an example of executing a VPMULUWR instruction on 64-bit registers, requiring only four 16×16 multiplications.

In some embodiments, the source and destination vector registers are each 32 bits, and the hardware is scaled such that multiplication circuit 407.1 executes two (2) 16×16 multiplications on two (2) corresponding pairs of elements of SRC1 401.1 and SRC2 403.1. In other words, when the vector registers are each 32 bits, the execution circuits 405.2-405.M and the multiplication circuits included therein, are not needed and not used. In some embodiments, the maximum supported vector register size is 32 bits, in which case execution circuits 405.2-405.M are not included, and only a quarter of the multipliers in multiplication circuit 407.1 are included. FIG. 2C and its related description provide an example of executing a VPMULUWR instruction on 32-bit registers, requiring only two 16×16 multiplications.

Various implementations of the multiplication circuit 407.1 may be used in various embodiments. In some embodiments, for example, multiple 4×4 multipliers are used to implement 16×16 multiplication.

In some embodiments that execute the vector multiplication instruction 400 on 256-bit or 512-bit vectors, rather than to replicate the hardware, the execution circuit 405.1 operates on 16 elements at time, and takes two cycles or four cycles to produce 256-bit or 512-bit results to store in the destinations, respectively. Similarly, in some embodiments, less hardware in multiplication circuit 407.1 and rounding circuit 409.1 is used multiple times over multiple clock cycles; for example, half of the multipliers is used to twice multiply four corresponding 16-bit elements of 128-bit source vectors.

In some embodiments, the decoded vector multiplication instruction 400 includes a vector size identifier (discussed below) to specify the number of bits—32, 64, 128, 256, or 512—in each source and destination vector register. In some embodiments, the vector size is derived from the type of vector register identified by the source and destination identifiers. In some embodiments, the identified vectors are 128-bit vectors by default, and, by default, have 16-bit elements. In some embodiments, the number of elements to be operated on is the vector size divided by the fixed size of the elements.

Rounding control register 411.1 is a software-accessible control register that controls the modes of rounding applied by rounding circuit 409.1. In some embodiments, rounding control register 411.1 includes a 2-bit rounding control field, which specifies truncation when set to 2'b11, rounding up when set to 2'b10, and convergent rounding otherwise. In some embodiments, each of the execution circuits 405.2-M includes its own rounding circuit 409.2-M (not shown) and rounding control register 411.2-M (not shown). In some embodiments, execution circuits 405.1-M share a rounding control circuit, including the 2-bit rounding control field.

Exemplary Methods of Execution of the VPMULUWR Instruction

Figure 5A:
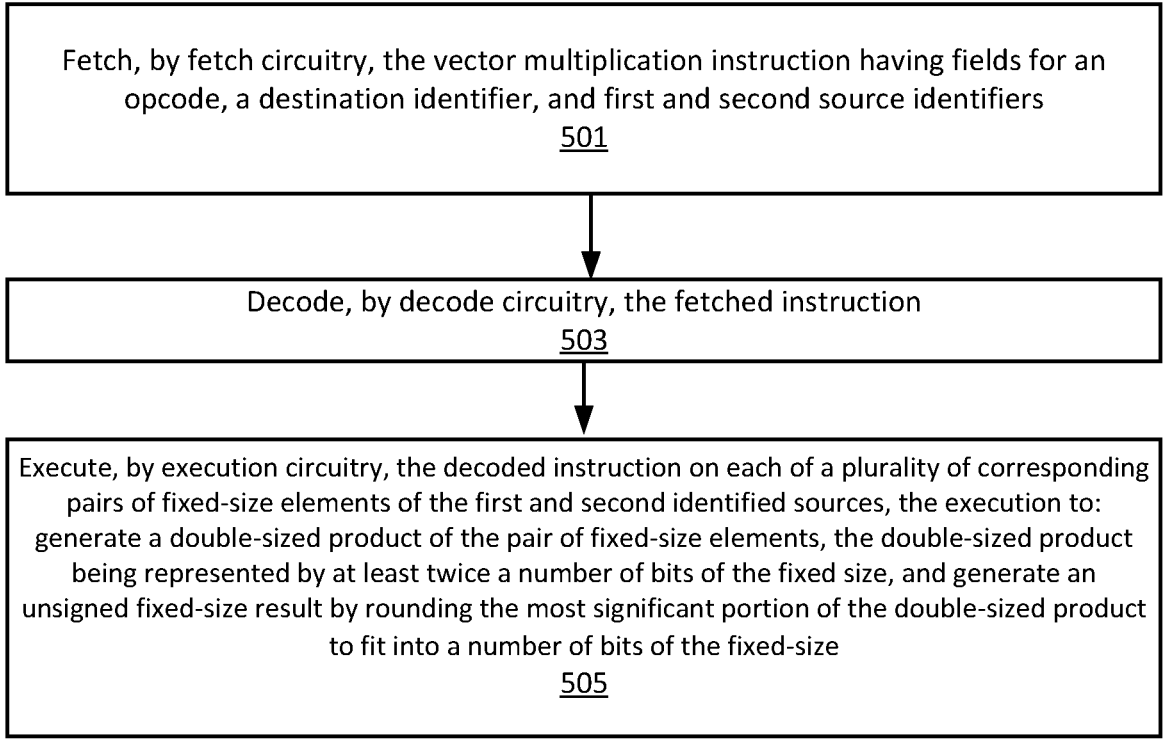
FIG. 5A illustrates an embodiment of an execution flow of a processor executing a VPMULUWR instruction, according to an embodiment.

FIG. 5A illustrates an embodiment of an execution flow of a processor executing a VPMULUWR instruction. For example, the processor components of FIG. 1, a pipeline as detailed below, etc. performs this method.

At 501, an instruction is fetched by fetch circuitry. For example, a VPMULUWR instruction is fetched. The VPMULUWR instruction includes fields for an opcode, a destination identifier, and first and second source identifiers. In some embodiments, the instruction is fetched from an instruction storage. The source identifiers and destination identifier each identifies a packed data vector register.

The opcode of the VPMULUWR instruction indicates a Vector Packed (VP) Multiplication (MUL) of Unsigned (U) Words (W) with Rounding (R). In different embodiments, different opcodes may be selected to convey the same vector multiplication instruction.

The fetched instruction is decoded at 503. For example, the fetched VPMULUWR instruction is decoded by decode circuitry such as that detailed herein.

At 505, the decoded instruction is executed by execution circuitry (hardware) such as that detailed herein. For the VPMULUWR instruction, the execution will cause execution circuitry to, on each of a plurality of corresponding pairs of fixed-sized elements of the identified first and second sources, generate a double-sized product of the pair of fixed-sized elements, the double-sized product being represented by at least twice a number of bits of the fixed size, and generate an unsigned fixed-sized result by rounding the most significant fixed-sized portion of the double-sized product to fit into the fixed-sized elements of the destination vector register.

Figure 5B:
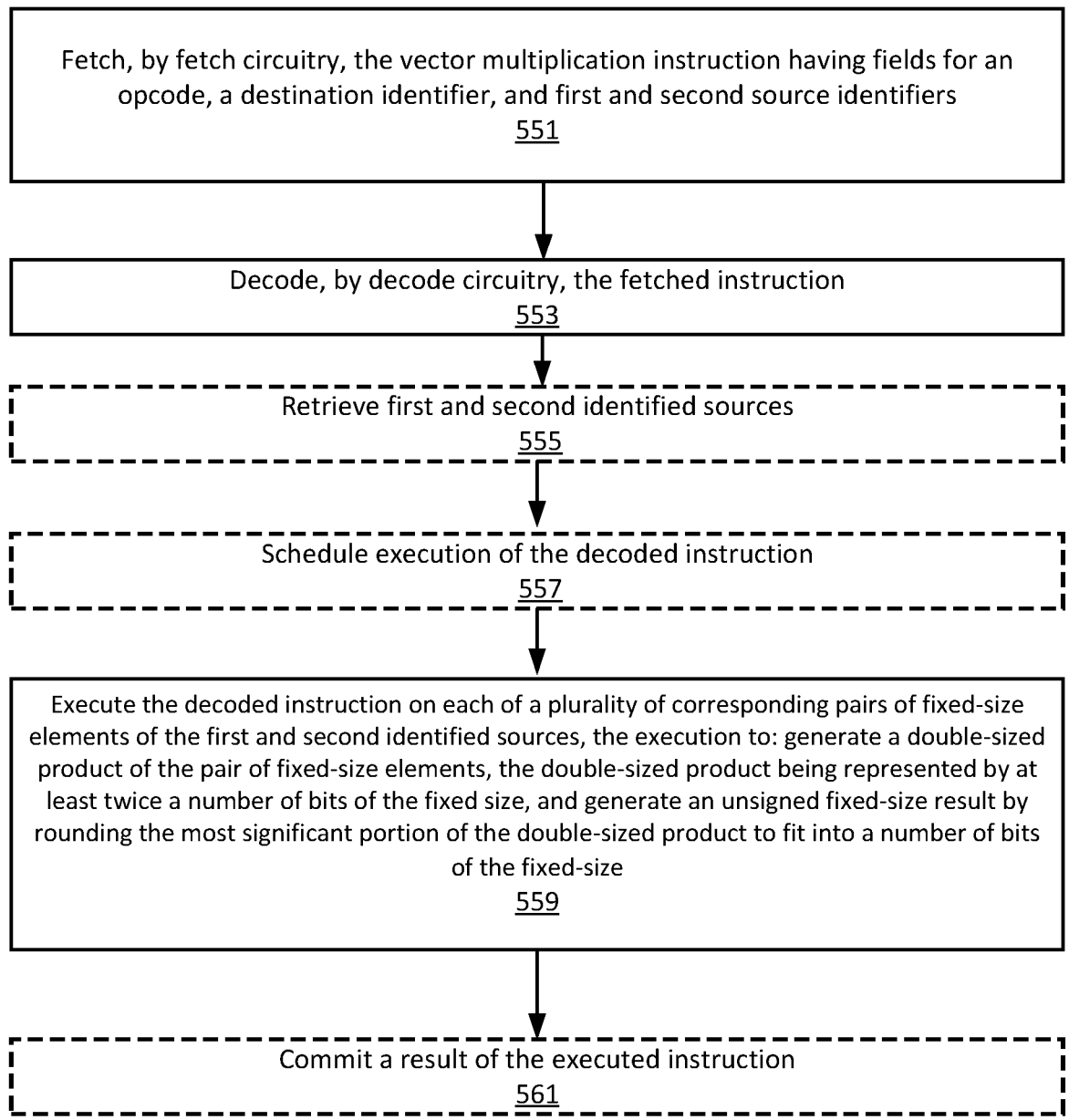
FIG. 5B illustrates an embodiment of an execution flow of a processor executing a VPMULUWR instruction, according to an embodiment.

FIG. 5B illustrates an embodiment of an execution flow of a processor executing a VPMULUWR instruction. For example, the processor components of FIG. 1, a pipeline as detailed below, etc. performs this method.

At 551, an instruction is fetched by fetch circuitry. For example, a VPMULUWR instruction is fetched. The VPMULUWR instruction includes fields for an opcode, a destination identifier, and first and second source identifiers. In some embodiments, the instruction further includes a field for a writemask. In some embodiments, the instruction is fetched from an instruction storage. The source identifiers and destination identifier identify packed data vector registers.

The fetched instruction is decoded at 553. For example, the fetched VPMULUWR instruction is decoded by decode circuitry such as that detailed herein.

Data values associated with the source identifiers of the decoded instruction are retrieved at 555 and the decoded instruction is scheduled (as needed) at 557. For example, when one or more of the source identifiers are memory locations, the data from the indicated memory location is retrieved. 555 and 557 are optional, at least insofar as they can be performed at a different time (e.g. earlier in the pipeline or prefetched) or by multiple different circuits.

At 559, the decoded instruction is executed by execution circuitry (hardware) such as that detailed herein. For the VPMULUWR instruction, the execution will cause execution circuitry to, on each of a plurality of corresponding pairs of fixed-sized elements of the identified first and second sources, generate a double-sized product of the pair of fixed-sized elements, the double-sized product being represented by at least twice a number of bits of the fixed size, and generate an unsigned fixed-sized result by rounding the most significant fixed-sized portion of the double-sized product to fit into the fixed-sized elements of the destination vector register.

In some embodiments, at 561, retirement/write back circuitry architecturally commits the destination register into the registers or memory and retires the instruction. 561 is optional, at least insofar as it can be performed at different times (e.g. buffering results for later execution).

Exemplary Formats of the VPMULUWR Instruction

An embodiment of a format for a VPMULUWR instruction is OPCODE DST, SRC1, SRC2. DST is a field for the packed data destination register. SRC1 and SRC2 are fields for the sources such as packed data registers and/or memory.

Figure 6:
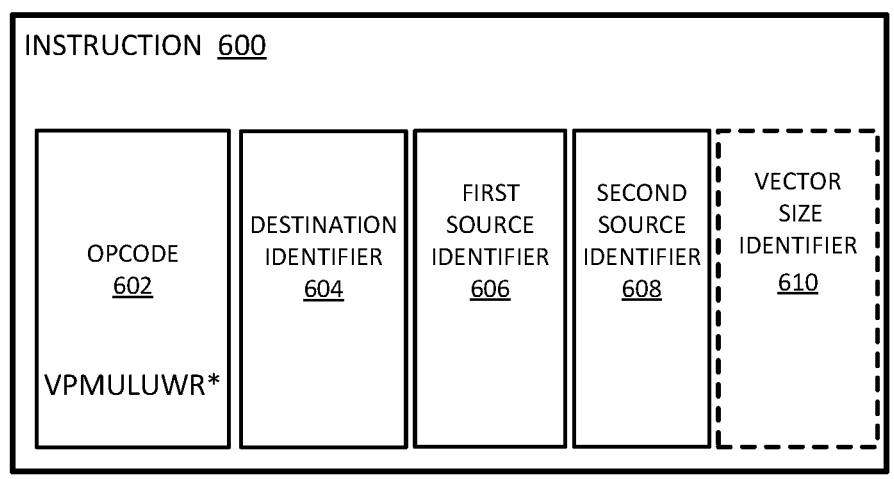
FIG. 6 is a block diagram illustrating a format for instructions for a vector multiplication of unsigned words with rounding, according to some embodiments.

FIG. 6 is a block diagram illustrating a format for instructions for a vector multiplication with rounding instruction, according to some embodiments. As shown, instruction 600 includes opcode 602, destination identifier 604, first source identifier 606, second source identifier 608, and optional vector size identifier 610 (optional instruction fields are shown in a shaded box with dashed outline).

Opcode 602 in some embodiments is VPMULUWR*. As shown, opcode 602 includes an asterisk ("*"), which signifies that optional suffixes or prefixes may be added to the opcode to control operations of the instruction. For example, in some embodiments, a prefix or suffix is added to the opcode to specify a vector size.

Figure 8:
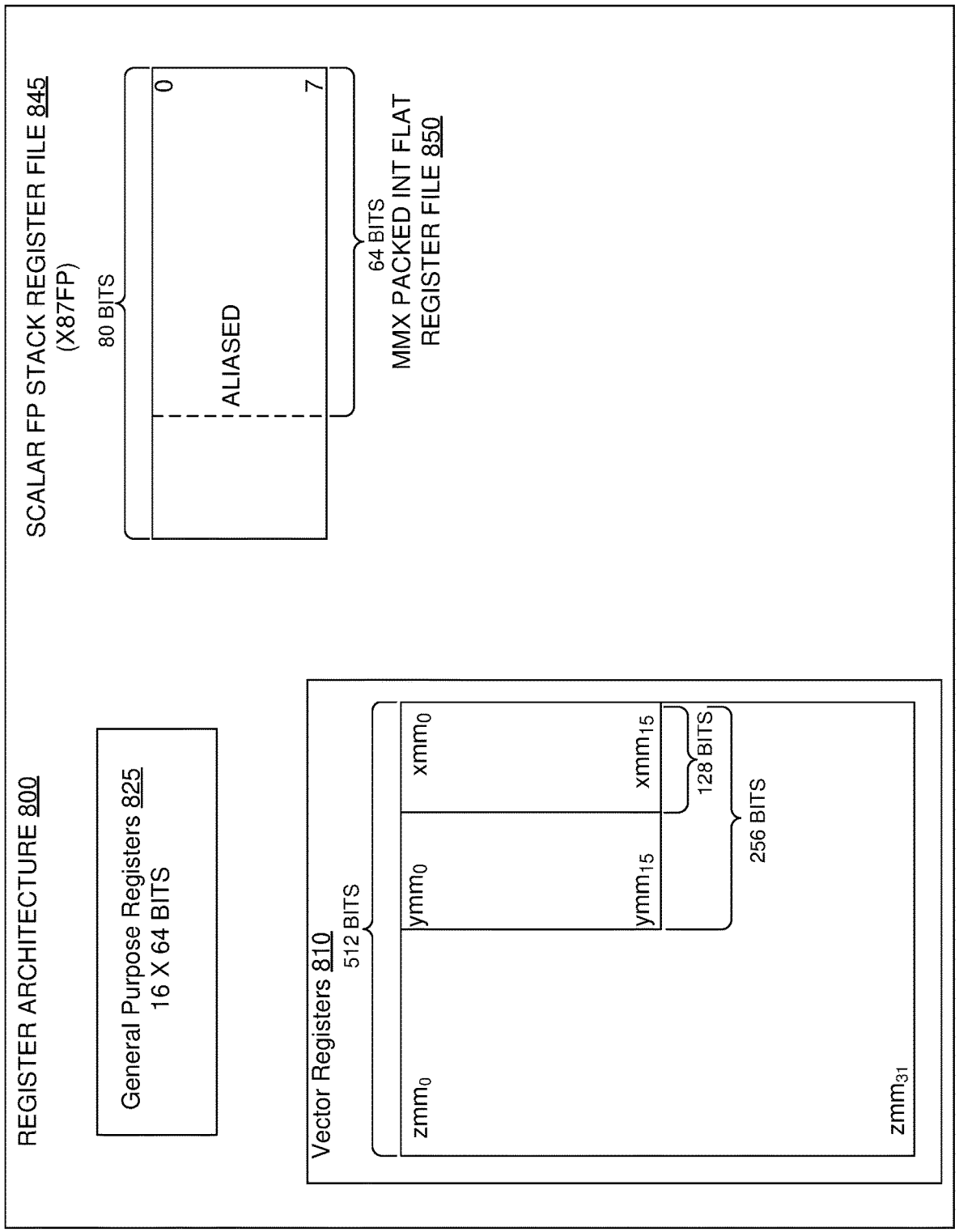
FIG. 8 is a block diagram of a register architecture according to one embodiment of the invention.

Destination identifier 604 in some embodiments is to specify a vector register, such as one of the vector registers provided in a processor's register file. FIG. 8 and its associated description describe an embodiment of a processor's register file.

First source identifier 606 and second source identifiers 608, in some embodiments, are to specify first and second source vector registers, such as the vector registers included in the processor's register file. FIG. 8 and its associated description describe an embodiment of a processor's register file.

Optional vector size identifier 610, in some embodiments, is included in the opcode, such as a prefix or suffix, corresponding to the size of the source and destination vectors on which to operate, which can include 32-bits, 64 bits, 128 bits, 256 bits, or 512 bits.

Exemplary instruction formats are further illustrated and described below with reference to FIG. 7A to FIG. 7C, which illustrate an exemplary AVX instruction format, including a VEX prefix 702, real opcode field 730, Mod R/M byte 740, SIB byte 750, displacement field 762, and IMM8 772. Comparing FIG. 6 to FIGS. 7A-C, first source identifier 606 in some embodiments of AVX instruction format, occupies the register index field 744, second source identifier 608 occupies the R/M field 746, and destination identifier 604 occupies the VEX.vvvv field 720.

In some embodiments, the VPMULUWR instruction includes a field for a writemask register operand (k) (e.g., VPMULUWR{k} DSTREG, SRC1, SRC2). A writemask is used to conditionally control per-element operations and updating of results. Depending upon the implementation, the writemask uses merging or zeroing masking. Instructions encoded with a predicate (writemask, write mask, or k register) operand use that operand to conditionally control per-element computational operation and updating of result to the identified destination. The predicate operand is known as the opmask (writemask) register. In some embodiments, the opmask is a set of architectural registers of size 64-bit. Note that from this set of architectural registers, only k1 through k7 can be addressed as predicate operand. k0 can be used as a regular source or destination but cannot be encoded as a predicate operand. Note also that a predicate operand can be used to enable memory fault-suppression for some instructions with a memory operand (source or destination). As a predicate operand, the opmask registers contain one bit to govern the operation/update to each data element of a vector register. In general, opmask registers can support instructions with element sizes: single-precision floating-point (float32), integer doubleword (int32), double-precision floating-point (float64), integer quadword (int64). The length of a opmask register, MAX_KL, is sufficient to handle up to 64 elements with one bit per element, i.e. 64 bits. For a given vector length, each instruction accesses only the number of least significant mask bits that are needed based on its data type. An opmask register affects an instruction at per-element granularity. So, any numeric or non-numeric operation of each data element and per-element updates of intermediate results to the identified destination are predicated on the corresponding bit of the opmask register. In most embodiments, an opmask serving as a predicate operand obeys the following properties: 1) the instruction's operation is not performed for an element if the corresponding opmask bit is not set (this implies that, for instructions that check for faults and raise exceptions, no exception or violation can be caused by an operation on a masked-off element, and consequently, no exception flag is updated as a result of a masked-off operation); 2) a destination element is not updated with the result of the operation if the corresponding writemask bit is not set. Instead, the destination element value must be preserved (merging-masking) or it must be zeroed out (zeroing-masking); 3) for some instructions with a memory operand, memory faults are suppressed for elements with a mask bit of 0. Note that this feature provides a versatile construct to implement control-flow predication as the mask in effect provides a merging behavior for vector register destinations. As an alternative, the masking can be used for zeroing instead of merging, so that the masked out elements are updated with 0 instead of preserving the old value. The zeroing behavior is provided to remove the implicit dependency on the old value when it is not needed.

In embodiments, encodings of the instruction include a scale-index-base (SIB) type memory addressing operand that indirectly identifies multiple indexed destination locations in memory. In one embodiment, an SIB type memory operand includes an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand includes an encoding identifying an index register. Each element of the index register may specify an index or offset value usable to compute, from the base address, an address of a respective destination location within a block of potential destination locations. In one embodiment, an SIB type memory operand includes an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x, y, z} identifies a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x, y, z} identifies a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

Instruction Sets

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128-bit registers. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 7A illustrates an exemplary AVX instruction format including a VEX prefix 702, real opcode field 730, Mod R/M byte 740, SIB byte 750, displacement field 762, and IMM8 772. FIG. 7B illustrates which fields from FIG. 7A make up a full opcode field 774 and a base operation field 741. FIG. 7C illustrates which fields from FIG. 7A make up a register index field 744.

VEX Prefix (Bytes 0-2) 702 is encoded in a three-byte form. The first byte is the Format Field 790 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 705 (VEX Byte 1, bits [7-5]) consists of a VEX.R bit field (VEX Byte 1, bit [7]—R), VEX.X bit field (VEX byte 1, bit [6]—X), and VEX.B bit field (VEX byte 1, bit [5]—B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 715 (VEX byte 1, bits [4:0]—mmmmm) includes content to encode an implied leading opcode byte. W Field 764 (VEX byte 2, bit [7]—W)—is represented by the notation VEX.W, and provides different functions depending on the instruction. The role of VEX.vvvv 720 (VEX Byte 2, bits [6:3]-vvvv) may include the following: 1) VEX.vvvv encodes the first source register operand, specified in inverted (is complement) form and is valid for instructions with 2 or more source operands; 2) VEX.vvvv encodes the destination register operand, specified in is complement form for certain vector shifts; or 3) VEX.vvvv does not encode any operand, the field is reserved and should contain 1111b. If VEX.L 768 Size field (VEX byte 2, bit [2]—L)=0, it indicates 128 bit vector; if VEX.L=1, it indicates 256 bit vector. Prefix encoding field 725 (VEX byte 2, bits [1:0]—pp) provides additional bits for the base operation field 741.

Real Opcode Field 730 (Byte 3) is also known as the opcode byte. Part of the opcode is specified in this field.

MOD R/M Field 740 (Byte 4) includes MOD field 742 (bits [7-6]), Reg field 744 (bits [5-3]), and R/M field 746 (bits [2-0]). The role of Reg field 744 may include the following: encoding either the destination register operand or a source register operand (the rrr of Rrrr), or be treated as an opcode extension and not used to encode any instruction operand. The role of R/M field 746 may include the following: encoding the instruction operand that references a memory address, or encoding either the destination register operand or a source register operand.

Scale, Index, Base (SIB)—The content of Scale field 750 (Byte 5) includes SS 752 (bits [7-6]), which is used for memory address generation. The contents of SIB.xxx 754 (bits [5-3]) and SIB.bbb 756 (bits [2-0]) have been previously referred to with regard to the register indexes Xxxx and Bbbb.

The Displacement Field 762 and the immediate field (IMM8) 772 contain data.

Exemplary Register Architecture

FIG. 8 is a block diagram of a register architecture 800 according to one embodiment of the invention. In the embodiment illustrated, there are 32 vector registers 810 that are 512 bits wide; these registers are referenced as zmm0 through zmm31. The lower order 256 bits of the lower 16 zmm registers are overlaid on registers ymm0-15. The lower order 128 bits of the lower 16 zmm registers (the lower order 128 bits of the ymm registers) are overlaid on registers xmm0-15.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length-decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922 (which is relevant to instructions that check for faults and generate exceptions), and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed; etc. In one embodiment, the physical register file(s) unit 958 comprises a vector registers unit and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Some embodiments include one or more digital signal processors (DSP) as part of execution units 962. The scheduler unit(s) 956 may schedule one or more micro-operations, micro-code entry points, microinstructions, other instructions, or other control signals derived from an instruction, to be performed by the DSP or by any of the number of execution units. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
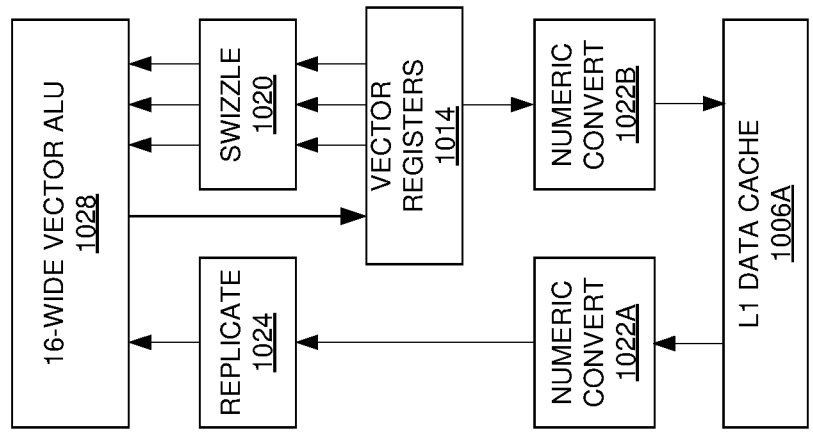
FIGS. 10A-B illustrate a block diagram of a more specific exemplary in-order core architecture, which core would be one of several logic blocks (including other cores of the same type and/or different types) in a chip.
Figure 10A:
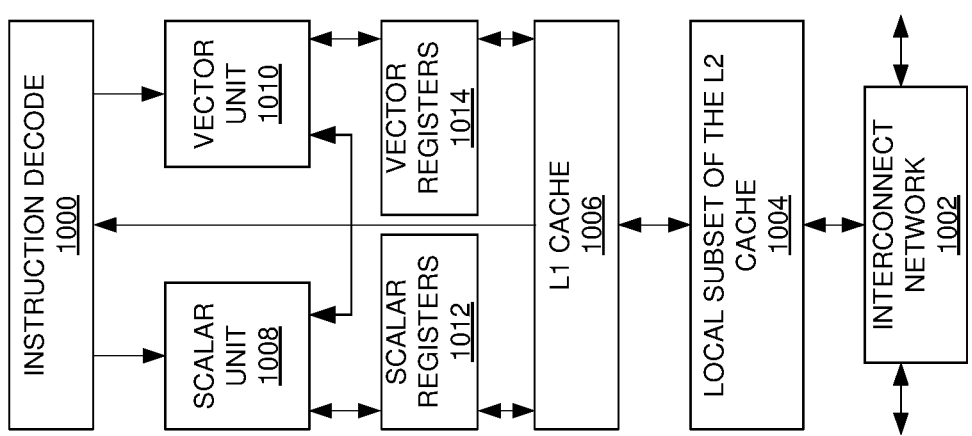

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input.

Processor with Integrated Memory Controller and Graphics

Figure 11:
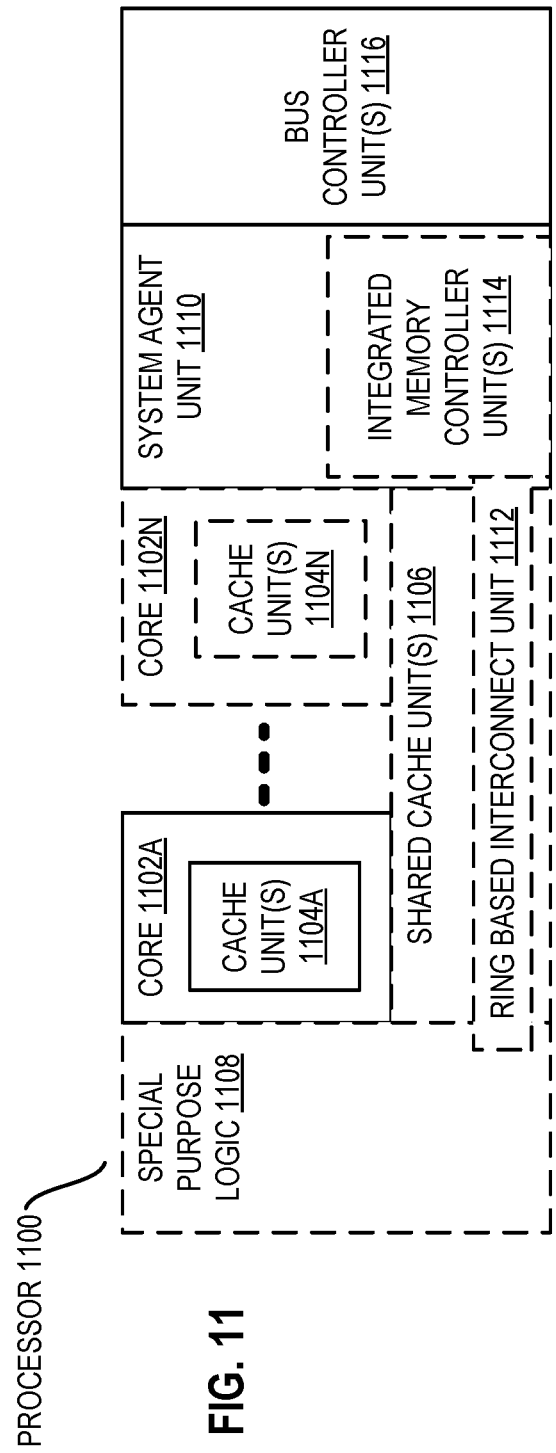
FIG. 11 is a block diagram of a processor that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache 1104A-N within the cores 1102A-N, a set of one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
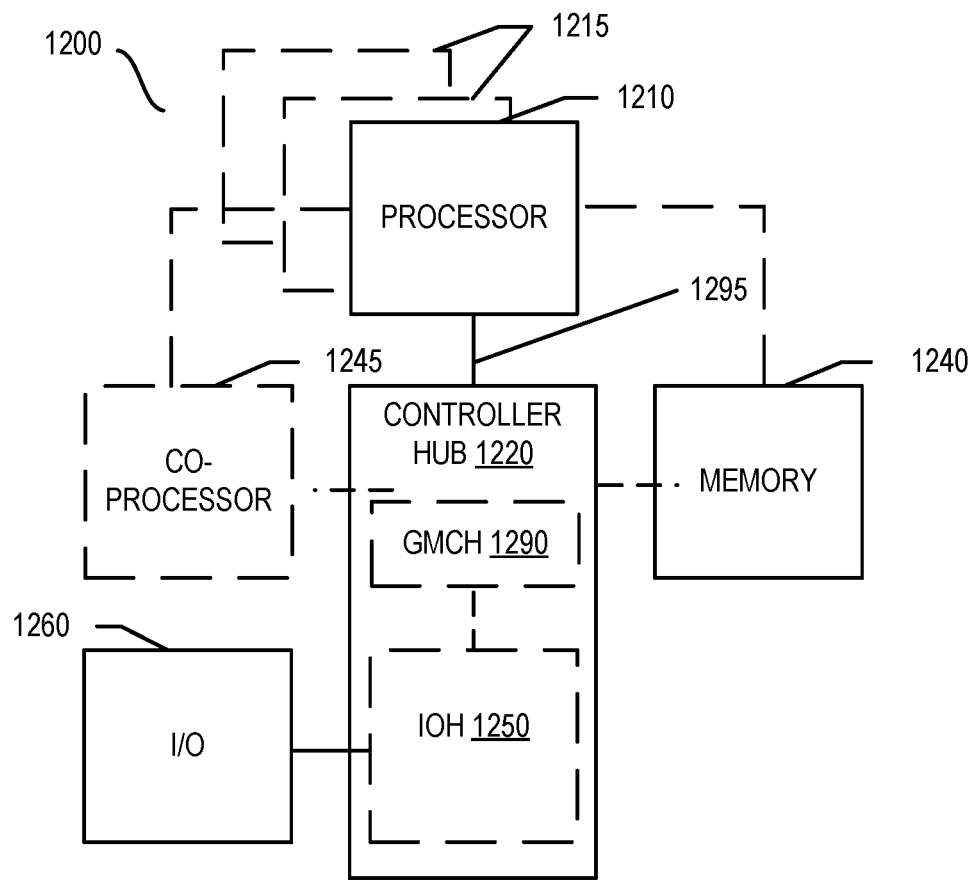
FIGS. 12-15 are block diagrams of exemplary computer architectures.

Referring now to FIG. 12, shown is a block diagram of a system 1200 in accordance with one embodiment of the present invention. The system 1200 may include one or more processors 1210, 1215, which are coupled to a controller hub 1220. In one embodiment, the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface, or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
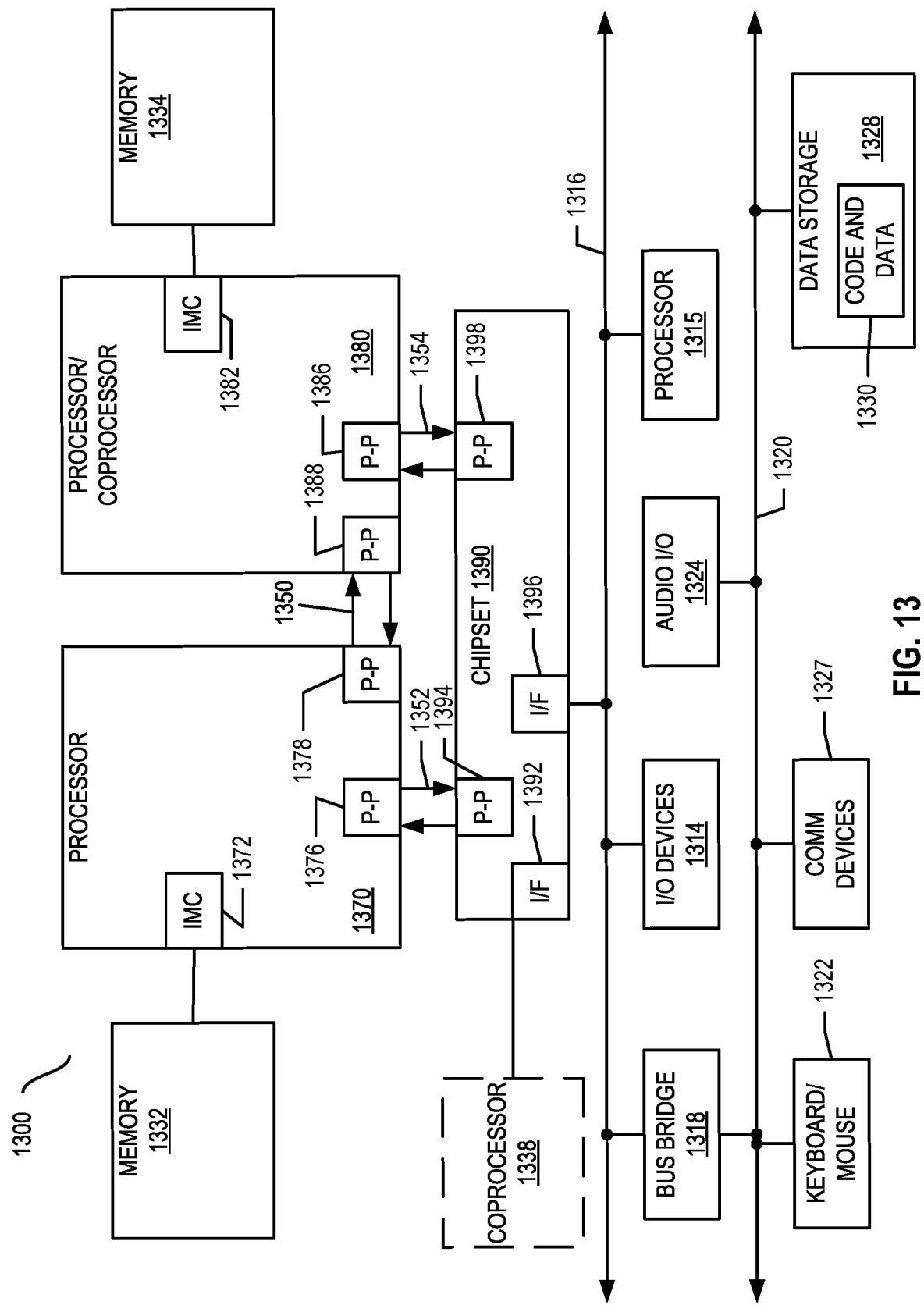

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1316. Note that other architectures are possible. For example, instead of the point-to-point architecture of FIG. 13, a system may implement a multi-drop bus or other such architecture.

Figure 14:
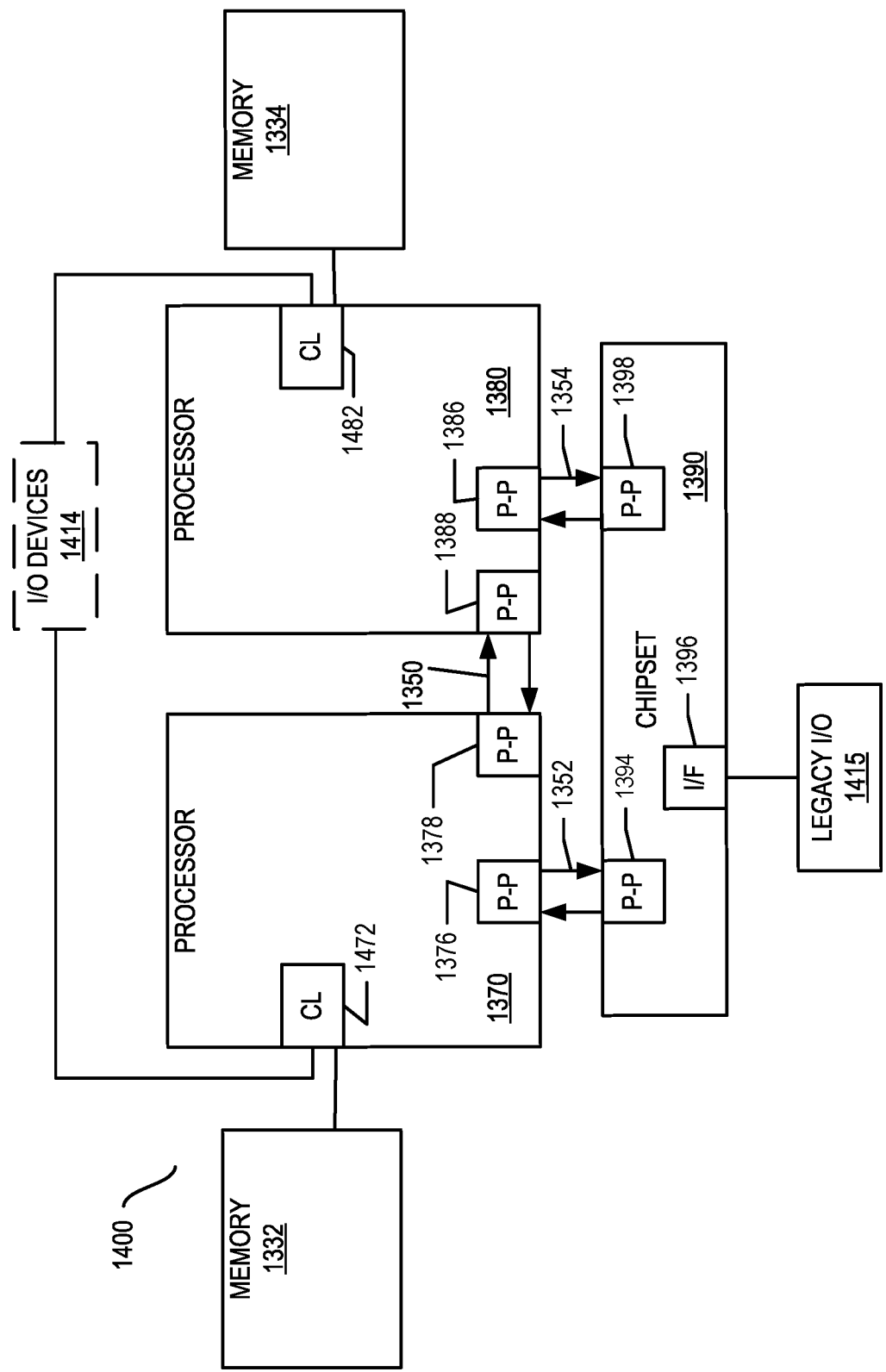

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1472 and 1482, respectively. Thus, the CL 1472, 1482 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
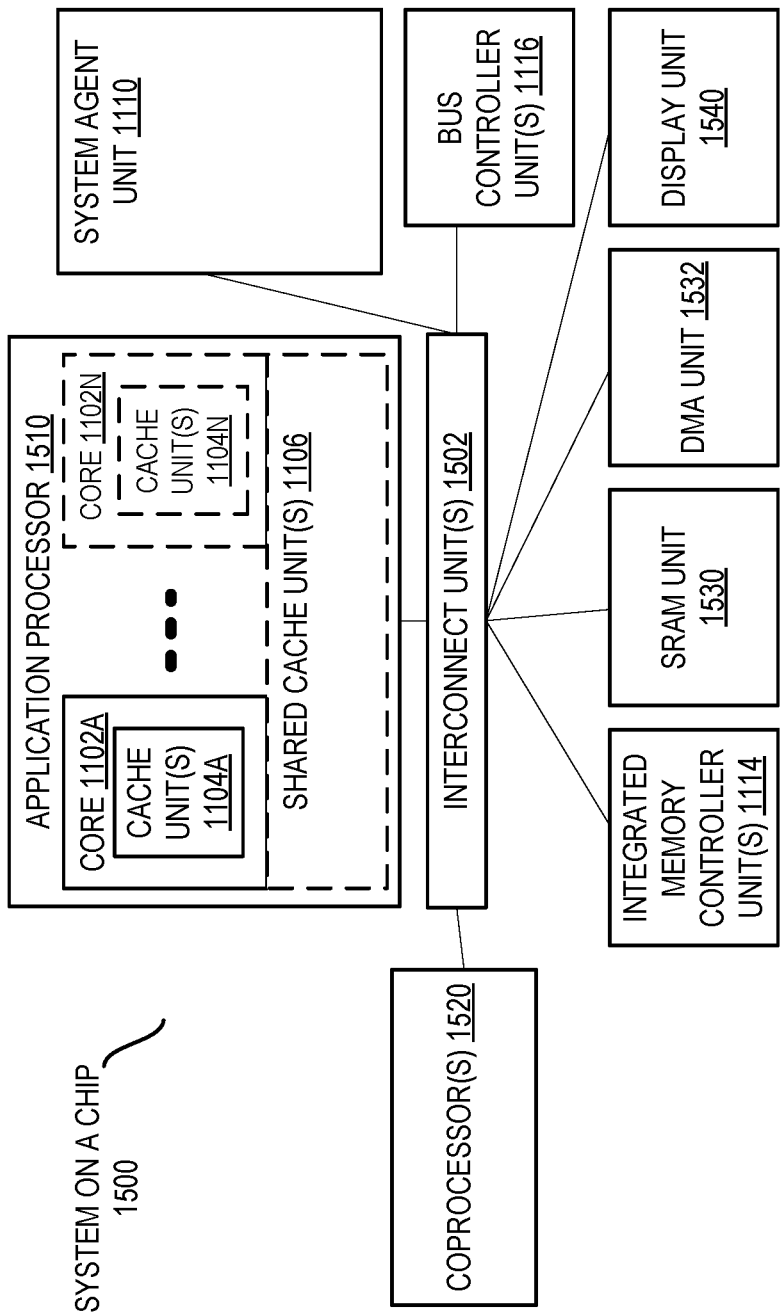

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 1102A-N, cache units 1104A-N, and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using a first compiler 1604 to generate a first binary code (e.g., x86) 1606 that may be natively executed by a processor with at least one first instruction set core 1616. In some embodiments, the processor with at least one first instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1604 represents a compiler that is operable to generate binary code of the first instruction set 1606 (e.g., object code) that can, with or without additional linkage processing, be executed on the processor with at least one first instruction set core 1616. Similarly, FIG. 16 shows the program in the high level language 1602 may be compiled using an alternative instruction set compiler 1608 to generate alternative instruction set binary code 1610 that may be natively executed by a processor without at least one first instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the first binary code 1606 into code that may be natively executed by the processor without a first instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have a first instruction set processor or core to execute the first binary code 1606.

Further Examples

Example 1 provides a processor to execute a vector multiplication instruction, the processor including: fetch circuitry to fetch the vector multiplication instruction having fields for an opcode, first and second source identifiers, and a destination identifier, decode circuitry to decode the fetched vector multiplication instruction, and execution circuitry to, on each of a plurality of pairs of corresponding fixed-sized elements of the identified first and second sources, execute the decoded vector multiplication instruction to: generate a double-sized product of each pair of fixed-sized elements, the double-sized product being represented by at least twice a number of bits of the fixed size, and generate an unsigned fixed-sized result by rounding the most significant fixed-sized portion of the double-sized product to fit into the identified destination.

Example 2 includes the substance of the exemplary processor of Example 1, wherein the fixed size is 16 bits, and wherein the execution circuitry is further to execute the decoded vector multiplication instruction in parallel on every element of the first and second identified sources.

Example 3 includes the substance of the exemplary processor of Example 1, wherein the first source identifier, the second source identifier, and the destination identifier each identifies a same-sized one of a 32-bit general purpose register, a 64-bit general purpose register, a 128-bit vector register, a 256-bit vector register, and a 512-bit vector register, having 16-bit elements.

Example 4 includes the substance of the exemplary processor of Example 1, wherein the fixed size is 16 bits and wherein the identified first source, second source, and destination each includes a 128-bit vector register.

Example 5 includes the substance of the exemplary processor of any one of Examples 1-3, wherein the execution circuitry is to execute the decoded vector multiplication instruction in parallel on every corresponding pair of fixed-size elements.

Example 6 includes the substance of the exemplary processor of Example 3, wherein the execution circuitry is to execute the decoded vector multiplication instruction on 16 corresponding pairs of elements at a time, taking one cycle, two cycles, and four cycles to execute the decoded vector multiplication instruction when the first source identifier, the second source identifier, and the destination identifier identify the 128-bit vector register, the 256-bit vector register, and the 512-bit vector register, respectively.

Example 7 includes the substance of the exemplary processor of any one of Examples 1-3, wherein the vector multiplication instruction further includes a vector size identifier to specify the size of the same-sized register.

Example 8 includes the substance of the exemplary processor of any one of Examples 1-3, further including a software-accessible control register to store a rounding control, wherein the execution circuitry uses the rounding control when rounding the most significant fixed-sized portion of the double-sized product, wherein the rounding control specifies one of truncating, rounding up, and convergent rounding.

Example 9 includes the substance of the exemplary processor of any one of Examples 1-3, wherein the vector multiplication instruction further identifies a write mask to conditionally control per-element computational operation and updating of results to the identified destination.

Example 10 includes the substance of the exemplary processor of any one of Examples 1-3, further including retirement circuitry to retire the executed vector multiplication instruction.

Example 11 provides a method of executing a vector multiplication instruction, the method including: fetching, by fetch circuitry, the vector multiplication instruction having fields for an opcode, first and second source identifiers, and a destination identifier, decoding, by decode circuitry, the fetched vector multiplication instruction, and executing, by execution circuitry, the decoded vector multiplication instruction to, on each of a plurality of pairs of corresponding fixed-sized elements of the identified first and second sources: generate a double-sized product of each pair of fixed-sized elements, the double-sized product being represented by at least twice a number of bits of the fixed size, and generate an unsigned fixed-sized result by rounding the most significant fixed-sized portion of the double-sized product to fit into the identified destination.

Example 12 includes the substance of the exemplary method of Example 11, wherein the fixed size is 16 bits, wherein the identified first source, second source, and destination each includes a 128-bit vector register, and further including executing, by the execution circuitry, the decoded vector multiplication instruction in parallel on every element of the first and second identified sources.

Example 13 includes the substance of the exemplary method of Example 11, further including using, by the execution circuitry when rounding the most significant fixed-sized portion of the double-sized product, a rounding control in a software-accessible control register to specify one of truncating, rounding up, and convergent rounding.

Example 14 includes the substance of the exemplary method of any one of Examples 11-13, wherein the first source identifier, the second source identifier, and the destination identifier each identifies a same-sized register having a size selected from a group consisting of a 32-bit general purpose register, a 64-bit general purpose register, a 128-bit vector register, a 256-bit vector register, and a 512-bit vector register, the selected register having 16-bit elements.

Example 15 includes the substance of the exemplary method of Example 14, further including executing, by the execution circuitry, the decoded vector multiplication instruction in parallel on every corresponding pair of fixed-size elements.

Example 16 includes the substance of the exemplary method of Example 14, further including executing, by the execution circuitry, the decoded vector multiplication instruction on 16 corresponding pairs of elements at a time, taking one cycle, two cycles, and four cycles to execute the decoded vector multiplication instruction when the first source identifier, the second source identifier, and the destination identifier each identifies the 128-bit vector register, the 256-bit vector register, and the 512-bit vector register, respectively.

Example 17 includes the substance of the exemplary method of Example 11, further including, after decoding the fetched vector multiplication instruction, retrieving data associated with the identified first and second sources, and scheduling execution of the decoded vector multiplication instruction.

Example 18 includes the substance of the exemplary method of Example 14, wherein the vector multiplication instruction further includes a vector size identifier to specify the size of the same-sized register.

Example 19 includes the substance of the exemplary method of any one of Examples 11-13, further including using, by the execution circuitry, a write mask identifier included in the vector multiplication instruction to identify a write mask to conditionally control per-element computational operation and updating of results to the identified destination.

Example 20 includes the substance of the exemplary method of any one of Examples 11-13, further including retiring, by retirement circuitry, the executed vector multiplication instruction.

Example 21 provides a non-transitory machine-readable medium having stored thereon instructions, when executed by a processor, to cause the processor to: fetch, by fetch circuitry, the vector multiplication instruction having fields for an opcode, first and second source identifiers, and a destination identifier, decode, by decode circuitry, the fetched vector multiplication instruction, and execute, by execution circuitry, the decoded vector multiplication instruction, on each of a plurality of pairs of corresponding fixed-sized elements of the identified first and second sources, to: generate a double-sized product of each pair of fixed-sized elements, the double-sized product being represented by at least twice a number of bits of the fixed size, and generate an unsigned fixed-sized result by rounding the most significant fixed-sized portion of the double-sized product to fit into the identified destination.

Example 22 includes the substance of the exemplary non-transitory machine-readable medium of Example 21, wherein the fixed size is 16 bits, wherein the identified first source, second source, and destination each includes a 128-bit vector register, and wherein the execution circuitry is further to execute the decoded vector multiplication instruction in parallel on every element of the first and second identified sources.

Example 23 includes the substance of the exemplary non-transitory machine-readable medium of Example 21, wherein the first source identifier, the second source identifier, and the destination identifier each identifies a same-sized one of a 32-bit general purpose register, a 64-bit general purpose register, a 128-bit vector register, a 256-bit vector register, and a 512-bit vector register, the identified same-sized register having 16-bit elements.

Example 24 includes the substance of the exemplary non-transitory machine-readable medium of any one of Examples 21-23, wherein the execution circuitry is to execute the decoded vector multiplication instruction on 16 corresponding pairs of elements at a time, taking one cycle, two cycles, and four cycles to execute the decoded vector multiplication instruction when the first source identifier, the second source identifier, and the destination identifier each identifies the 128-bit vector register, the 256-bit vector register, and the 512-bit vector register, respectively.

Example 25 includes the substance of the exemplary non-transitory machine-readable medium of any one of Examples 21-23, wherein the execution circuitry is to execute the decoded vector multiplication instruction in parallel on every corresponding pair of fixed-size elements.

Example 26 includes the substance of the exemplary non-transitory machine-readable medium of any one of Examples 21-23, wherein the fixed size is 16 bits, and wherein the execution circuitry is further to execute the decoded vector multiplication instruction in parallel on every element of the first and second identified sources.

Example 27 includes the substance of the exemplary non-transitory machine-readable medium of any one of Examples 21-23, wherein the vector multiplication instruction further includes a vector size identifier to specify the same-size.

Example 28 includes the substance of the exemplary non-transitory machine-readable medium of any one of Examples 21-23, wherein the execution circuitry is further to use, when rounding the most significant fixed-sized portion of the double-sized product, a rounding control in a software-accessible control register, the rounding control to specify one of truncating, rounding up, and convergent rounding.

Example 29 includes the substance of the exemplary non-transitory machine-readable medium of any one of Examples 21-23, wherein the vector multiplication instruction further identifies a write mask to conditionally control per-element computational operation and updating of results to the identified destination.

Example 30 includes the substance of the exemplary non-transitory machine-readable medium of any one of Examples 21-23, where the processor is further to retire, using retirement circuitry, the executed vector multiplication instruction.

Example 31 provides a system to execute a vector multiplication instruction, the system including: a memory, and a processor including: means for fetching the vector multiplication instruction having fields for an opcode, first and second source identifiers, and a destination identifier, means for decoding the fetched vector multiplication instruction, and means for executing the decoded vector multiplication instruction, on each of a plurality of pairs of corresponding fixed-sized elements of the identified first and second sources, to: generate a double-sized product of each pair of fixed-sized elements, the double-sized product being represented by at least twice a number of bits of the fixed size, and generate an unsigned fixed-sized result by rounding the most significant fixed-sized portion of the double-sized product to fit into the identified destination.

Example 32 includes the substance of the exemplary system of Example 31, wherein the fixed size is 16 bits and wherein the identified first source, second source, and destination each includes a 128-bit vector register.

Example 33 includes the substance of the exemplary system of Example 31, wherein the fixed size is 16 bits, and wherein the means for executing is further to execute the decoded vector multiplication instruction in parallel on every element of the first and second identified sources.

Example 34 includes the substance of the exemplary system of Example 31, further including a software-accessible control register to store a rounding control, wherein the means for executing uses the rounding control when rounding the most significant fixed-sized portion of the double-sized product, wherein the rounding control specifies one of truncating, rounding up, and convergent rounding.

Example 35 includes the substance of the exemplary system of any one of Examples 31-34, wherein the vector multiplication instruction further identifies a write mask to conditionally control per-element computational operation and updating of results to the identified destination.

Example 36 includes the substance of the exemplary system of any one of Examples 31-34, further including retirement circuitry to retire the executed vector multiplication instruction.

Example 37 includes the substance of the exemplary system of any one of Examples 31-34, wherein the first source identifier, the second source identifier, and the destination identifier identify a same-sized one of a 32-bit general purpose register, a 64-bit general purpose register, a 128-bit vector register, a 256-bit vector register, and a 512-bit vector register, having 16-bit elements.

Example 38 includes the substance of the exemplary system of Example 37, wherein the vector multiplication instruction further includes a vector size identifier to specify the size of the same-sized register.

Example 39 includes the substance of the exemplary system of Example 37, wherein the means for executing is to execute the decoded vector multiplication instruction in parallel on every corresponding pair of fixed-size elements.

Example 40 includes the substance of the exemplary system of Example 37, wherein the means for executing is to execute the decoded vector multiplication instruction on 16 corresponding pairs of elements at a time, taking one cycle, two cycles, and four cycles to execute the decoded vector multiplication instruction when the first source identifier, the second source identifier, and the destination identifier identify the 128-bit vector register, the 256-bit vector register, and the 512-bit vector register, respectively.

What is claimed is:

1. A processor comprising:
fetch circuitry to fetch a vector multiplication instruction having fields for an opcode, first and second source identifiers, and a destination identifier;
decode circuitry to decode the fetched vector multiplication instruction; and
execution circuitry to, on each of a plurality of pairs of corresponding fixed-sized multiple-bit signed elements of the identified first and second sources, execute the decoded vector multiplication instruction to:
generate a double-sized product of each pair of fixed-sized multiple-bit signed elements, the double-sized product being represented by at least twice a number of bits of the fixed-size,
generate, for each double-sized product, a result of the fixed-size by rounding the double-sized product, and store each fixed-sized result into a corresponding fixed-sized element of the identified destination.

2. The processor of claim 1, wherein the fixed-size is 16 bits, and wherein the execution circuitry is further to execute the decoded vector multiplication instruction in parallel on every element of the first and second identified sources.

3. The processor of claim 1, wherein the first source identifier, the second source identifier, and the destination identifier each identifies a same-sized one of a 32-bit general purpose register, a 64-bit general purpose register, a 128-bit vector register, a 256-bit vector register, or a 512-bit vector register, having 16-bit elements.

4. The processor of claim 1, wherein the fixed-size is 16 bits and wherein the identified first source, second source, and destination each comprises a 128-bit vector register.

5. The processor of claim 1, wherein the fixed-size is 16 bits and wherein the identified first source and destination each comprises a 128-bit vector register, and the second source is selectable between a 128-bit vector register and a 128-bit memory location.

6. The processor of claim 1, wherein the execution circuitry is to execute the decoded vector multiplication instruction in parallel on every corresponding pair of fixed-size elements.

7. The processor of claim 1, wherein the execution circuitry is to execute the decoded vector multiplication instruction on 16 corresponding pairs of elements at a time, taking one cycle to execute the decoded vector multiplication instruction when the first source identifier, the second source identifier, and the destination identifier identify a 128-bit vector.

8. The processor of claim 7, wherein the vector multiplication instruction further comprises a vector size identifier to specify a vector size of 128-bits.

9. The processor of claim 1, further comprising a software-accessible control register to store a rounding control, wherein the execution circuitry uses the rounding control when rounding the double-sized product, wherein the rounding control is selectable between rounding up and convergent rounding.

10. A method comprising:
fetching, by fetch circuitry, a vector multiplication instruction having fields for an opcode, first and second source identifiers, and a destination identifier;
decoding, by decode circuitry, the fetched vector multiplication instruction; and
executing, by execution circuitry, the decoded vector multiplication instruction, on each of a plurality of pairs of corresponding fixed-sized multiple-bit signed elements of the identified first and second sources, to:
generate a double-sized product of each pair of fixed-sized multiple-bit signed elements, the double-sized product being represented by at least twice a number of bits of the fixed-size,
generate, for each double-sized product, a result of the fixed-size by rounding the double-sized product, and
store each fixed-sized result into a corresponding element of the identified destination.

11. The method of claim 10, wherein the fixed-size is 16 bits, wherein the identified first source, second source, and destination each comprises a 128-bit vector register, and further comprising executing, by the execution circuitry, the decoded vector multiplication instruction in parallel on every element of the first and second identified sources.

12. The method of claim 10, further comprising using, by the execution circuitry when rounding the double-sized product, a rounding control, in a software-accessible control register, selectable between truncating, rounding up, and convergent rounding.

13. The method of claim 10, wherein the first source identifier, the second source identifier, and the destination identifier each identifies a same-sized register selected from a group consisting of a 32-bit general purpose register, a 64-bit general purpose register, a 128-bit vector register, a 256-bit vector register, and a 512-bit vector register, the selected register having 16-bit elements.

14. The method of claim 10, further comprising executing, by the execution circuitry, the decoded vector multiplication instruction in parallel on every corresponding pair of fixed-size elements.

15. The method of claim 10, wherein the fixed-size is 16 bits and wherein the identified first source and destination each comprises a 128-bit vector register, and the second source is selectable between a 128-bit vector register and a 128-bit memory location.

16. The method of claim 10, further comprising executing, by the execution circuitry, the decoded vector multiplication instruction on 16 corresponding pairs of elements at a time, taking one cycle to execute the decoded vector multiplication instruction when the first source identifier, the second source identifier, and the destination identifier each identify a 128-bit vector.

17. The method of claim 10, further comprising, after decoding the fetched vector multiplication instruction, retrieving data associated with the identified first and second sources, and scheduling execution of the decoded vector multiplication instruction.

18. A system comprising:
a memory to store a vector multiplication instruction; and
a processor coupled to the memory and comprising:
means for fetching the vector multiplication instruction having fields for an opcode, first and second source identifiers, and a destination identifier;
means for decoding the fetched vector multiplication instruction; and
means for executing the decoded vector multiplication instruction, on each of a plurality of pairs of corresponding fixed-sized multiple-bit signed elements of the identified first and second sources, to:
generate a double-sized product of each pair of fixed-sized multiple-bit signed elements, the double-sized product being represented by at least twice a number of bits of the fixed-size,
generate, for each double-sized product, a result of the fixed-size by rounding the double-sized product, and
store each fixed-sized result into a corresponding element of the identified destination.

19. The system of claim 18, wherein the fixed-size is 16 bits and wherein the identified first source, second source, and destination each comprises a 128-bit vector register.

20. The system of claim 18, wherein the fixed-size is 16 bits, and wherein the means for executing is further to execute the decoded vector multiplication instruction in parallel on every element of the first and second identified sources.

21. The system of claim 18, further comprising a software-accessible control register to store a rounding control, wherein the means for executing uses the rounding control when rounding the double-sized product, wherein the rounding control is selectable between truncating, rounding up, and convergent rounding.

22. The system of claim 18, wherein the vector multiplication instruction further identifies a write mask to conditionally control per-element computational operation and updating of results to the identified destination.

23. The system of claim 18, wherein the fixed-size is 16 bits and wherein the identified first source and destination each comprises a 128-bit vector register, and the second source is selectable between a 128-bit vector register and a 128-bit memory location.

* * * * *